United States Patent
Miyata et al.

(10) Patent No.: US 9,260,096 B2
(45) Date of Patent: Feb. 16, 2016

(54) BRAKE FLUID PRESSURE CONTROL APPARATUS FOR VEHICLE

(75) Inventors: Kazuaki Miyata, Nagano (JP); Takeshi Kojima, Saitama (JP); Tomoyuki Futamura, Saitama (JP)

(73) Assignees: NISSIN KOGYO CO., LTD., Nagano (JP); HONDA MOTOR CO., LTD., Tokyo (JP)

( * ) Notice: Subject to any disclaimer, the term of this patent is extended or adjusted under 35 U.S.C. 154(b) by 924 days.

(21) Appl. No.: 13/401,205

(22) Filed: Feb. 21, 2012

(65) Prior Publication Data

US 2012/0212043 A1 Aug. 23, 2012

(30) Foreign Application Priority Data

| Feb. 22, 2011 | (JP) | ................................. 2011-036439 |
| Feb. 22, 2011 | (JP) | ................................. 2011-036440 |
| Feb. 22, 2011 | (JP) | ................................. 2011-036441 |

(51) Int. Cl.
| B60T 8/1755 | (2006.01) |
| B60T 13/66 | (2006.01) |
| B60T 7/04 | (2006.01) |
| B60T 13/68 | (2006.01) |

(52) U.S. Cl.
CPC ............. *B60T 8/17554* (2013.01); *B60T 7/042* (2013.01); *B60T 13/662* (2013.01); *B60T 13/686* (2013.01); *B60T 2230/03* (2013.01)

(58) Field of Classification Search
CPC ... B60T 8/17554; B60T 7/042; B60T 13/662; B60T 13/686; B60T 2230/03
USPC ................................. 303/9.62, 9.67, 139–148
See application file for complete search history.

(56) References Cited

U.S. PATENT DOCUMENTS

| 6,086,168 A | 7/2000 | Rump |
| 6,397,127 B1* | 5/2002 | Meyers et al. .................... 701/1 |
| 6,829,524 B2* | 12/2004 | Chee ................................. 701/1 |
| 7,643,926 B2* | 1/2010 | Yasui et al. ...................... 701/72 |
| 7,848,866 B2* | 12/2010 | Nimmo et al. .................. 701/70 |
| 8,014,922 B2* | 9/2011 | Le et al. .......................... 701/45 |

(Continued)

FOREIGN PATENT DOCUMENTS

| JP | 10-81215 | 3/1998 |
| JP | 2001-509448 | 7/2001 |

(Continued)

*Primary Examiner* — Robert A Siconolfi
*Assistant Examiner* — Charles Poon
(74) *Attorney, Agent, or Firm* — Hamre, Schumann, Mueller & Larson, P.C.

(57) ABSTRACT

A brake fluid pressure control apparatus for a vehicle includes a parameter calculation unit configured to calculate a rollover detection parameter; and a steering maneuver determination unit configured to determine whether an abrupt steering maneuver is made. The parameter calculation unit is configured to calculate a first composition roll angle as the rollover detection parameter, by combining at a predetermined weight assignment ratio a first roll angle equivalent to an actual roll angle with a second roll angle obtained using a parameter which changes with a phase earlier than the first roll angle, and to calculate the first composition roll angle by changing the weight assignment ratio such that a weight of the second roll angle is higher when the steering maneuver determination unit determines that an abrupt steering maneuver is made than when the steering maneuver determination unit determines that the abrupt steering maneuver is not made.

8 Claims, 20 Drawing Sheets

(56) References Cited

U.S. PATENT DOCUMENTS

| | | | |
|---|---|---|---|
| 2004/0064246 A1* | 4/2004 | Lu et al. | 701/124 |
| 2004/0102894 A1* | 5/2004 | Holler | 701/124 |
| 2005/0012392 A1* | 1/2005 | Kato et al. | 303/191 |
| 2005/0017578 A1* | 1/2005 | Kato et al. | 303/146 |
| 2005/0046274 A1* | 3/2005 | Banno et al. | 303/147 |
| 2005/0236894 A1* | 10/2005 | Lu et al. | 303/139 |
| 2006/0030991 A1* | 2/2006 | Barta et al. | 701/70 |
| 2006/0074530 A1* | 4/2006 | Meyers et al. | 701/1 |
| 2006/0129298 A1* | 6/2006 | Takeda | 701/70 |
| 2006/0241828 A1* | 10/2006 | Yasui et al. | 701/28 |
| 2006/0267404 A1* | 11/2006 | Yasui et al. | 303/146 |
| 2006/0273657 A1* | 12/2006 | Wanke et al. | 303/146 |
| 2007/0170667 A1* | 7/2007 | Xu et al. | 280/5.507 |
| 2008/0054718 A1* | 3/2008 | Nishino et al. | 303/146 |
| 2008/0061625 A1* | 3/2008 | Schmitt et al. | 303/146 |
| 2008/0086248 A1* | 4/2008 | Lu et al. | 701/41 |
| 2008/0086251 A1* | 4/2008 | Lu et al. | 701/70 |
| 2008/0243335 A1* | 10/2008 | Rao et al. | 701/38 |
| 2010/0191423 A1* | 7/2010 | Koyama et al. | 701/42 |

FOREIGN PATENT DOCUMENTS

| | | |
|---|---|---|
| JP | 2003-118553 | 4/2003 |
| JP | 2004-268870 | 9/2004 |
| JP | 2006-298212 | 11/2006 |
| JP | 2006-335192 | 12/2006 |
| JP | 2007-513002 | 5/2007 |
| WO | WO 99/01311 | 1/1999 |

* cited by examiner

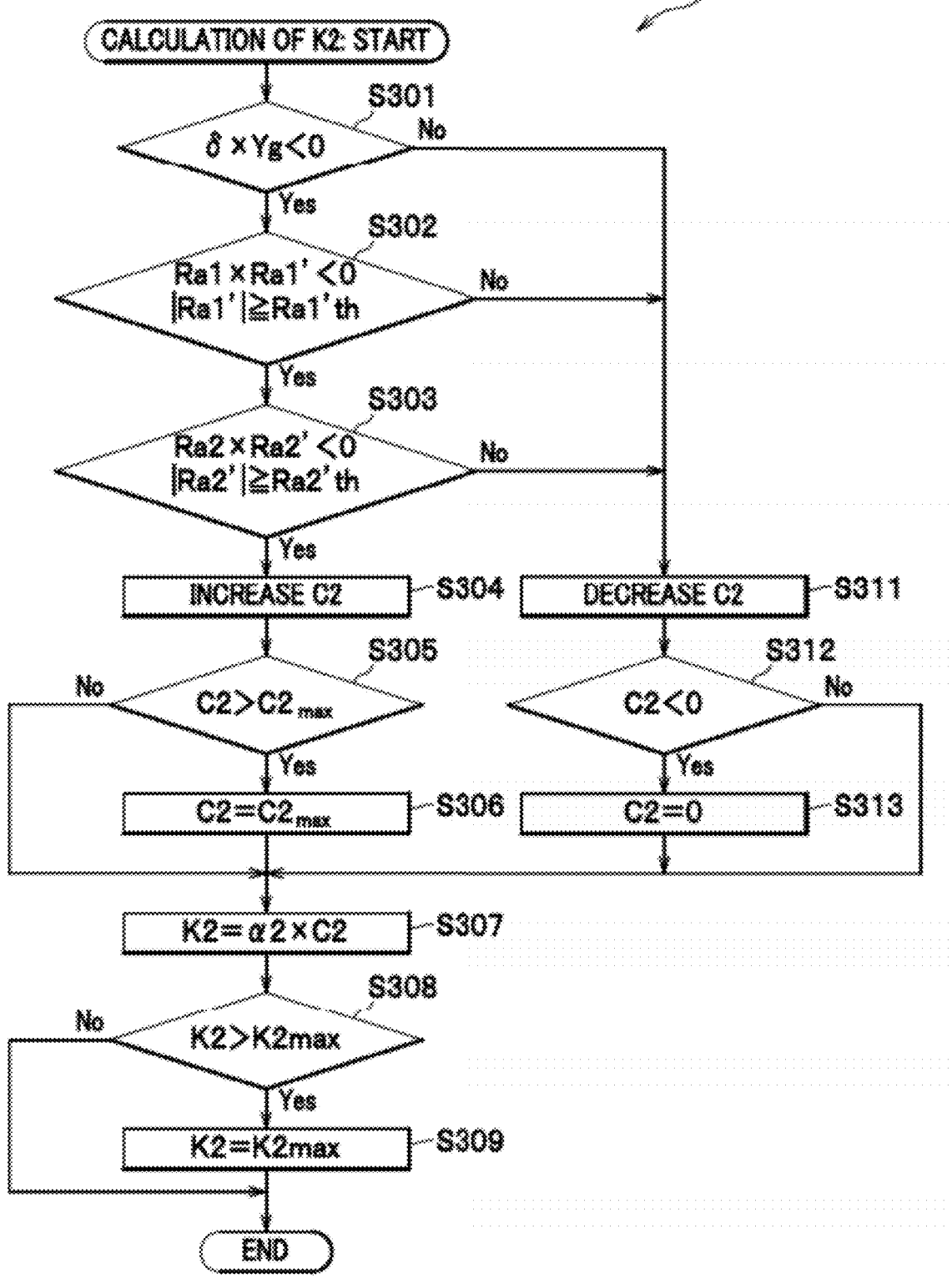

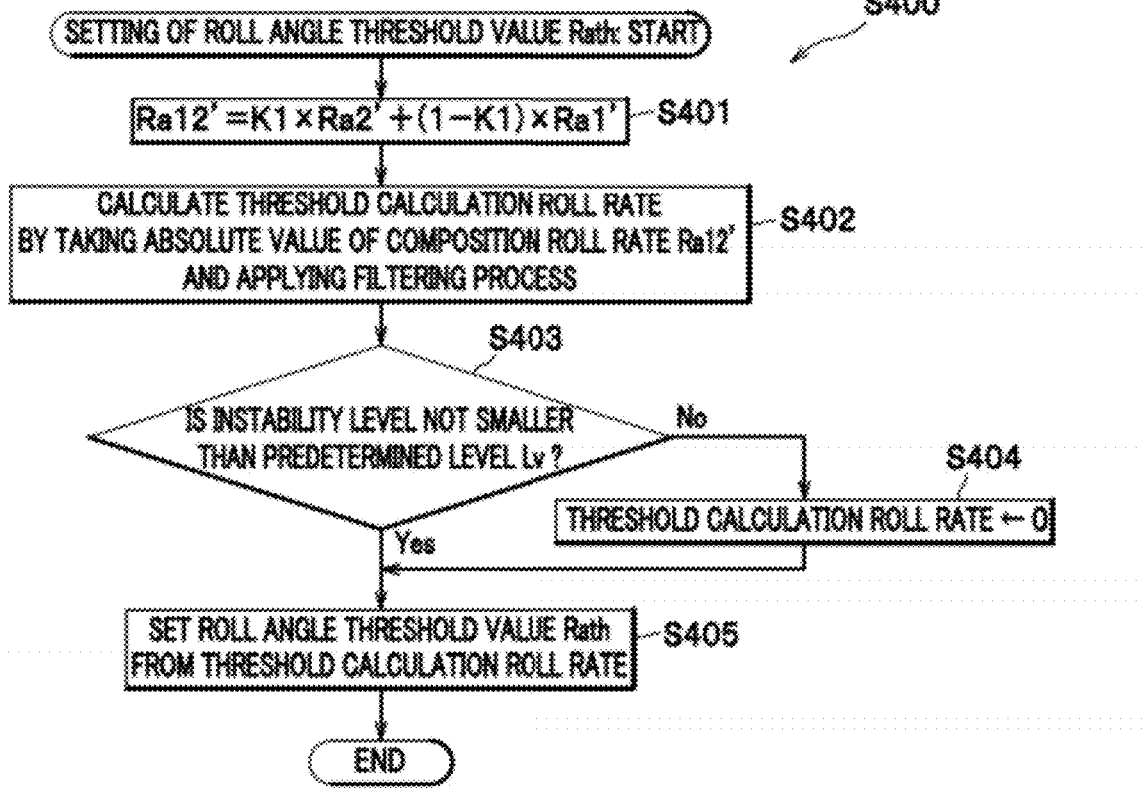
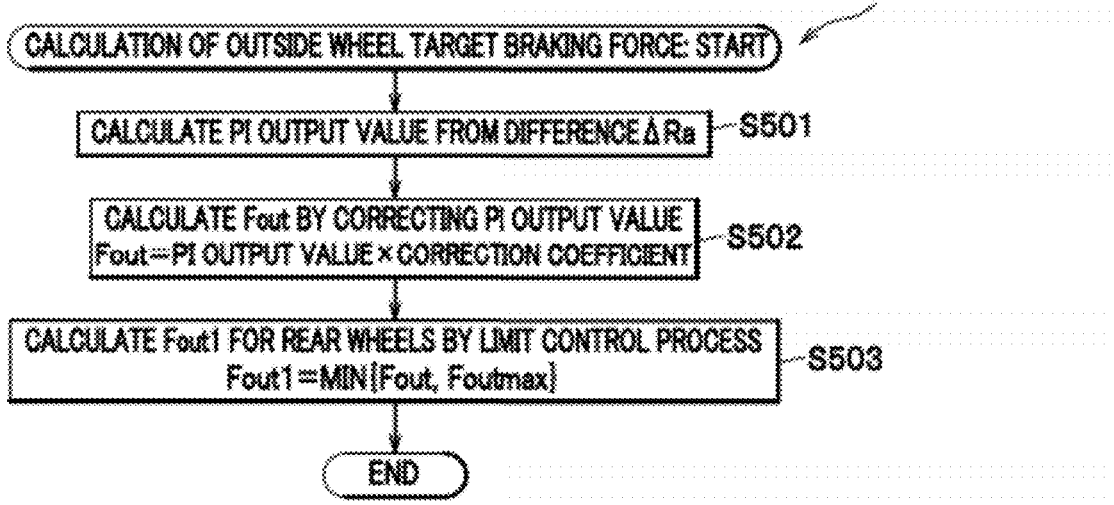

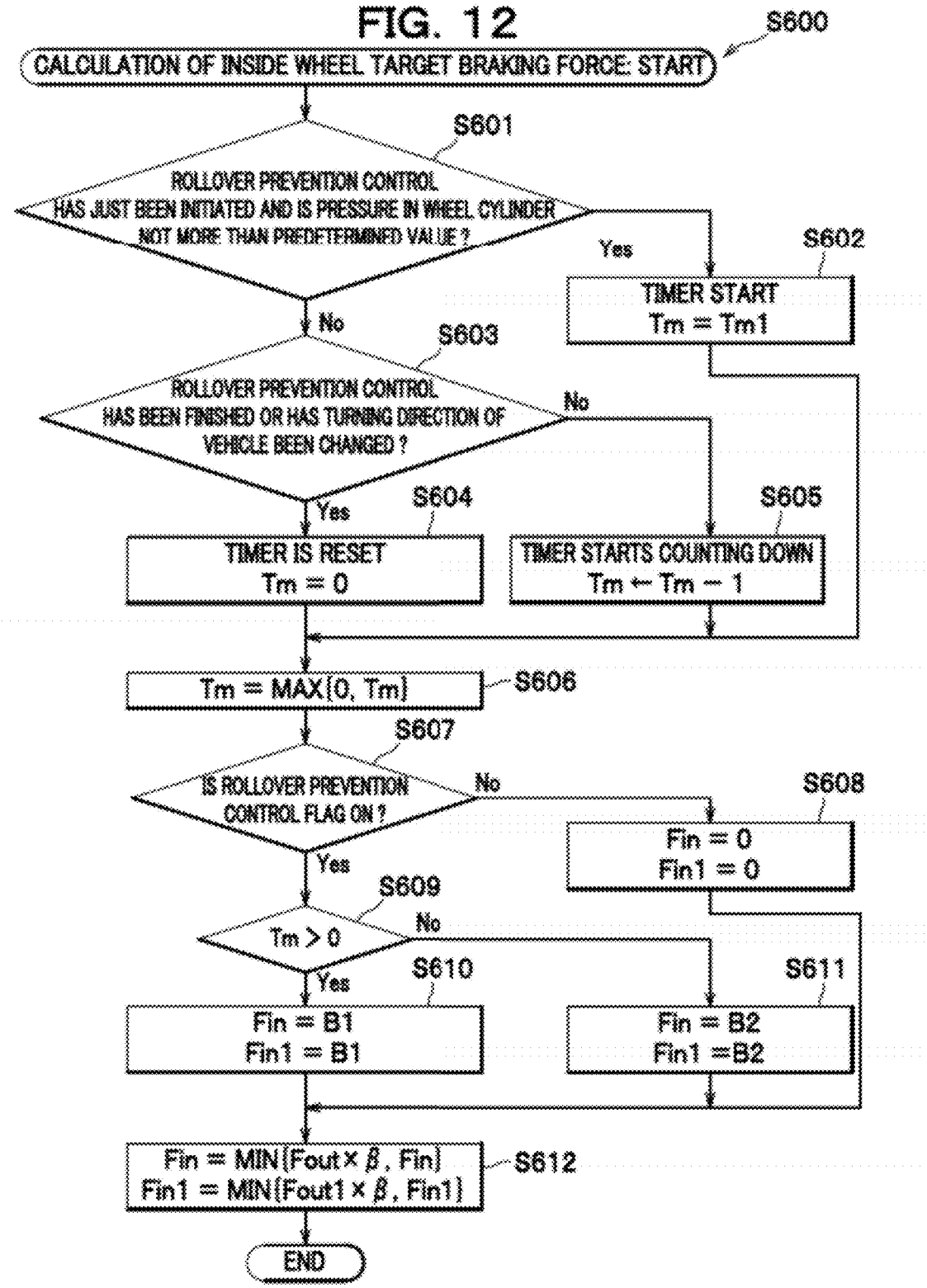

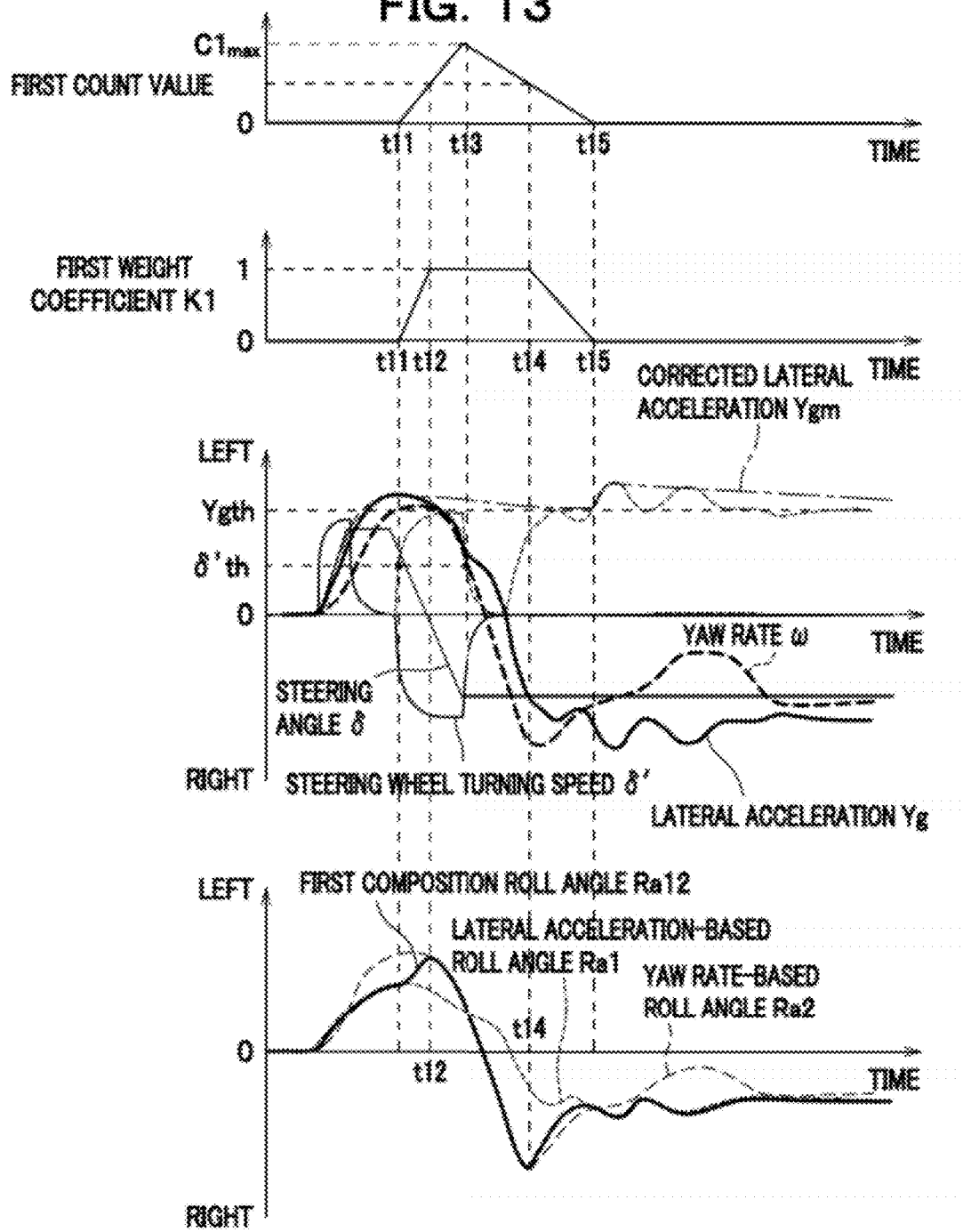

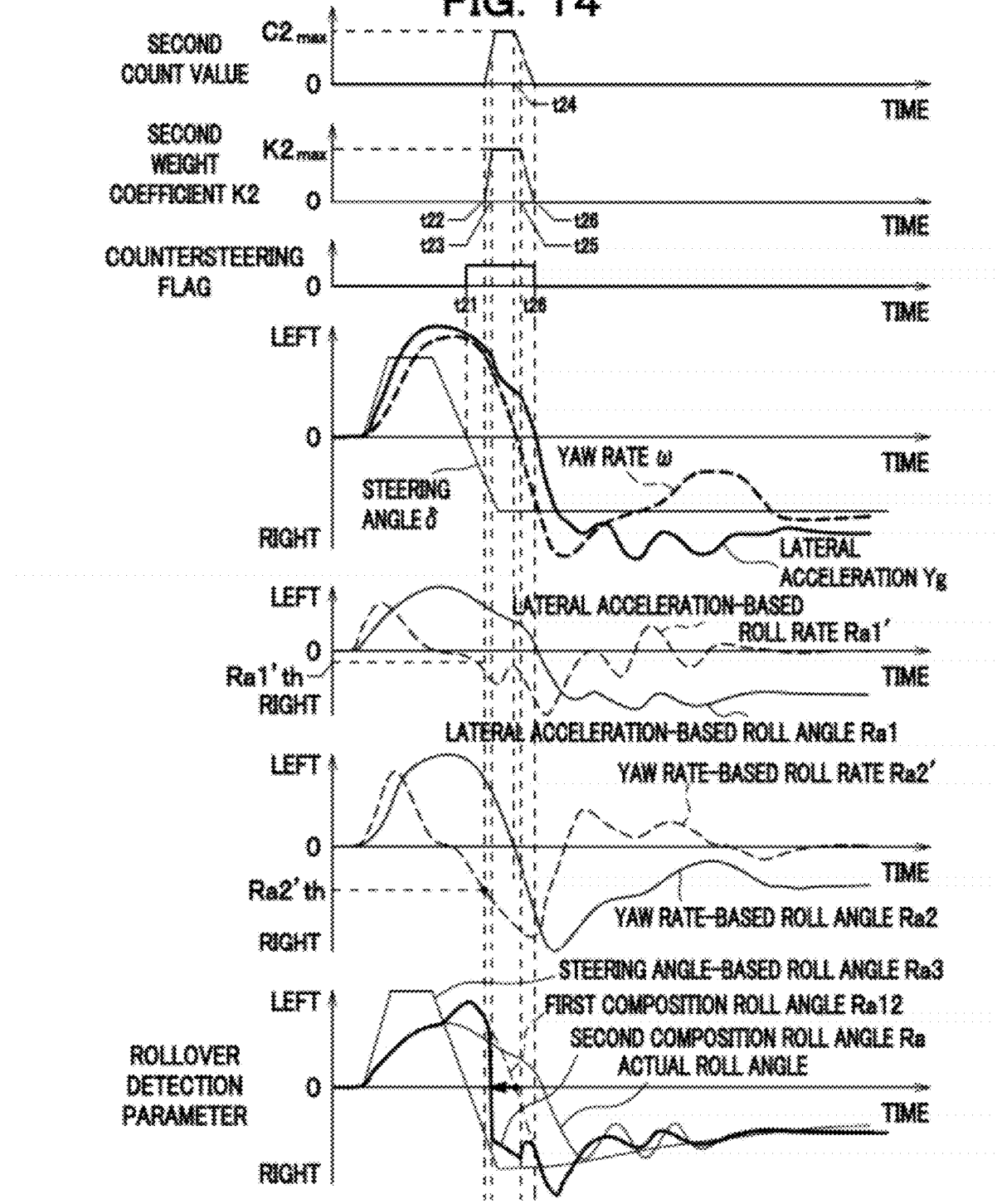

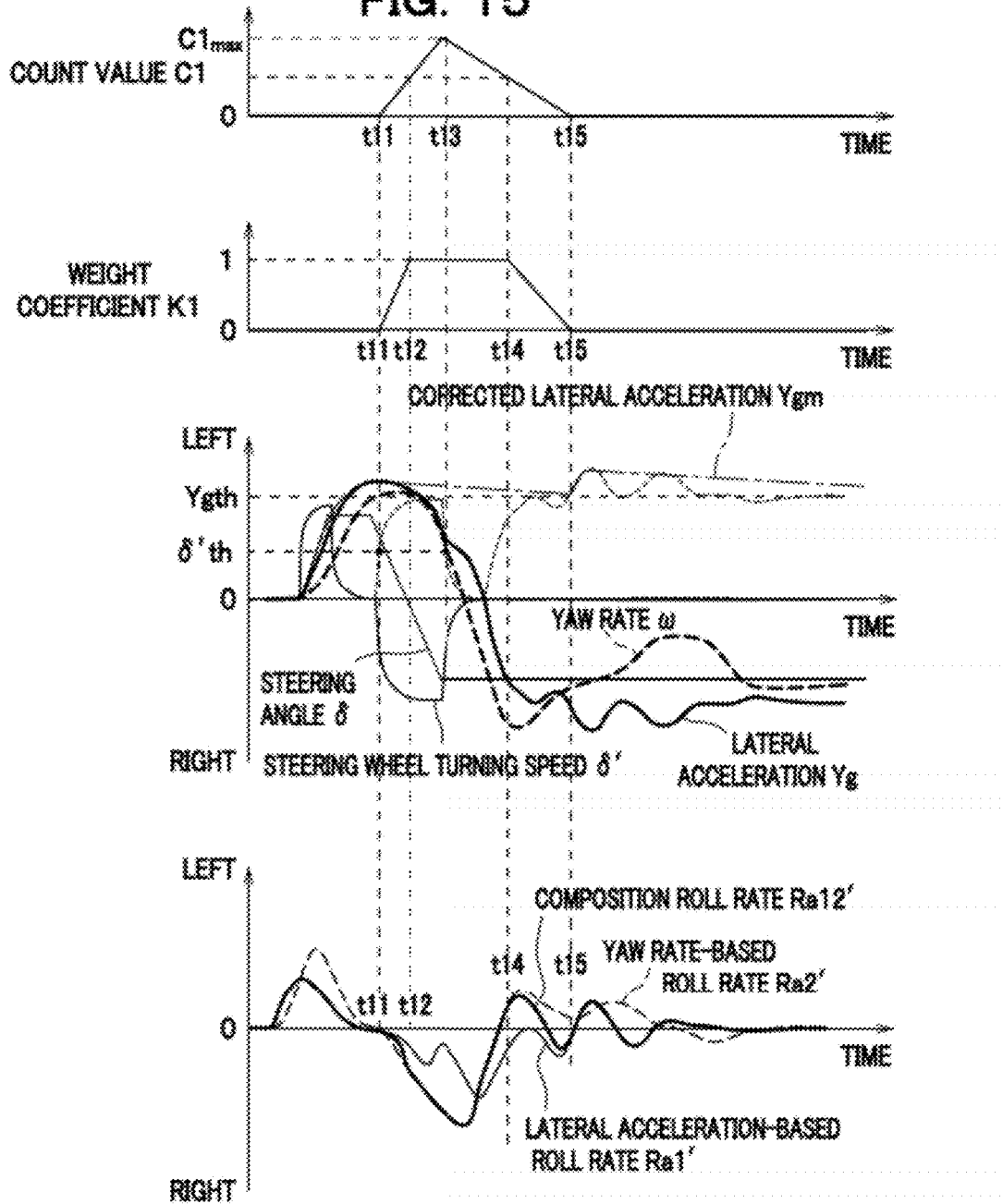

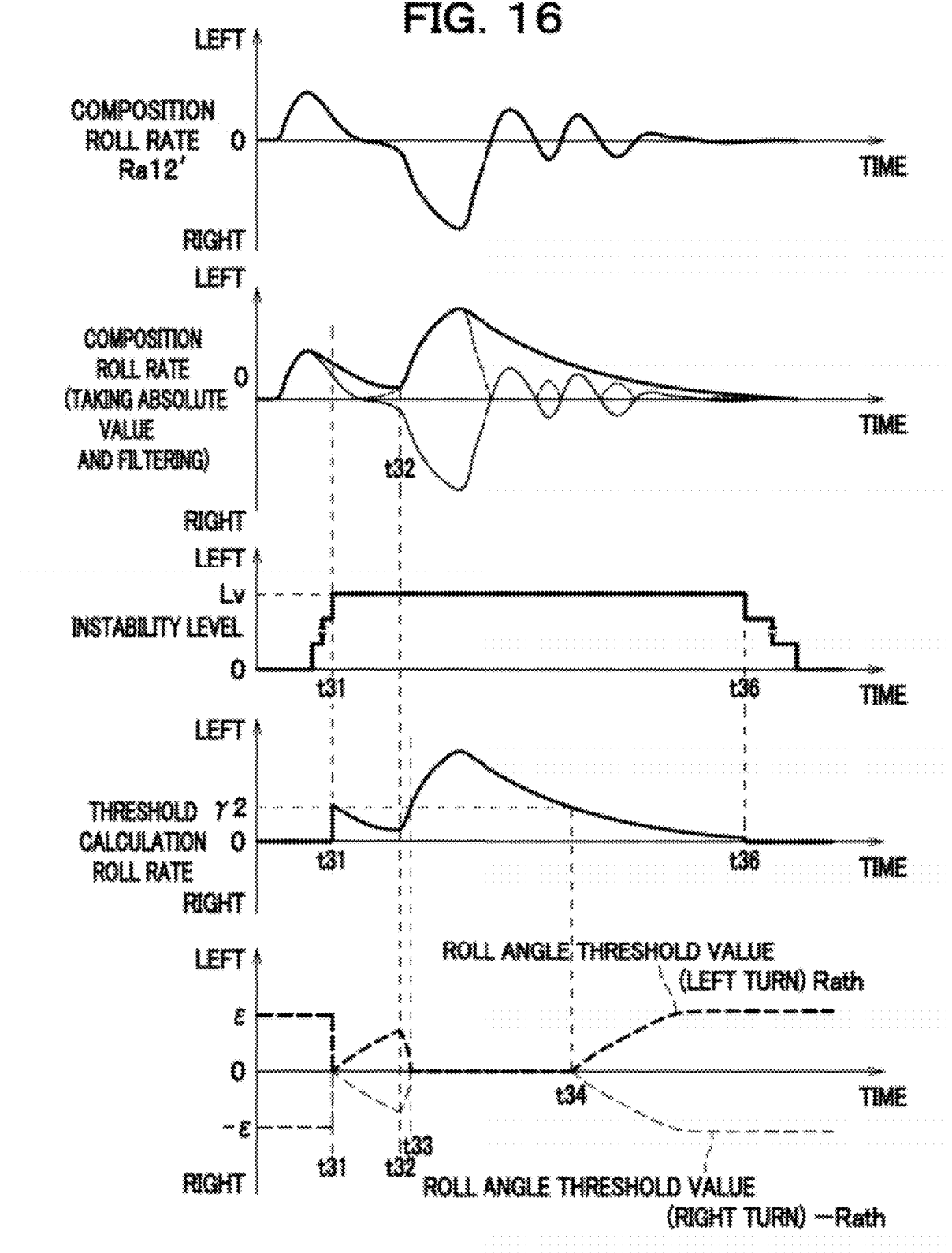

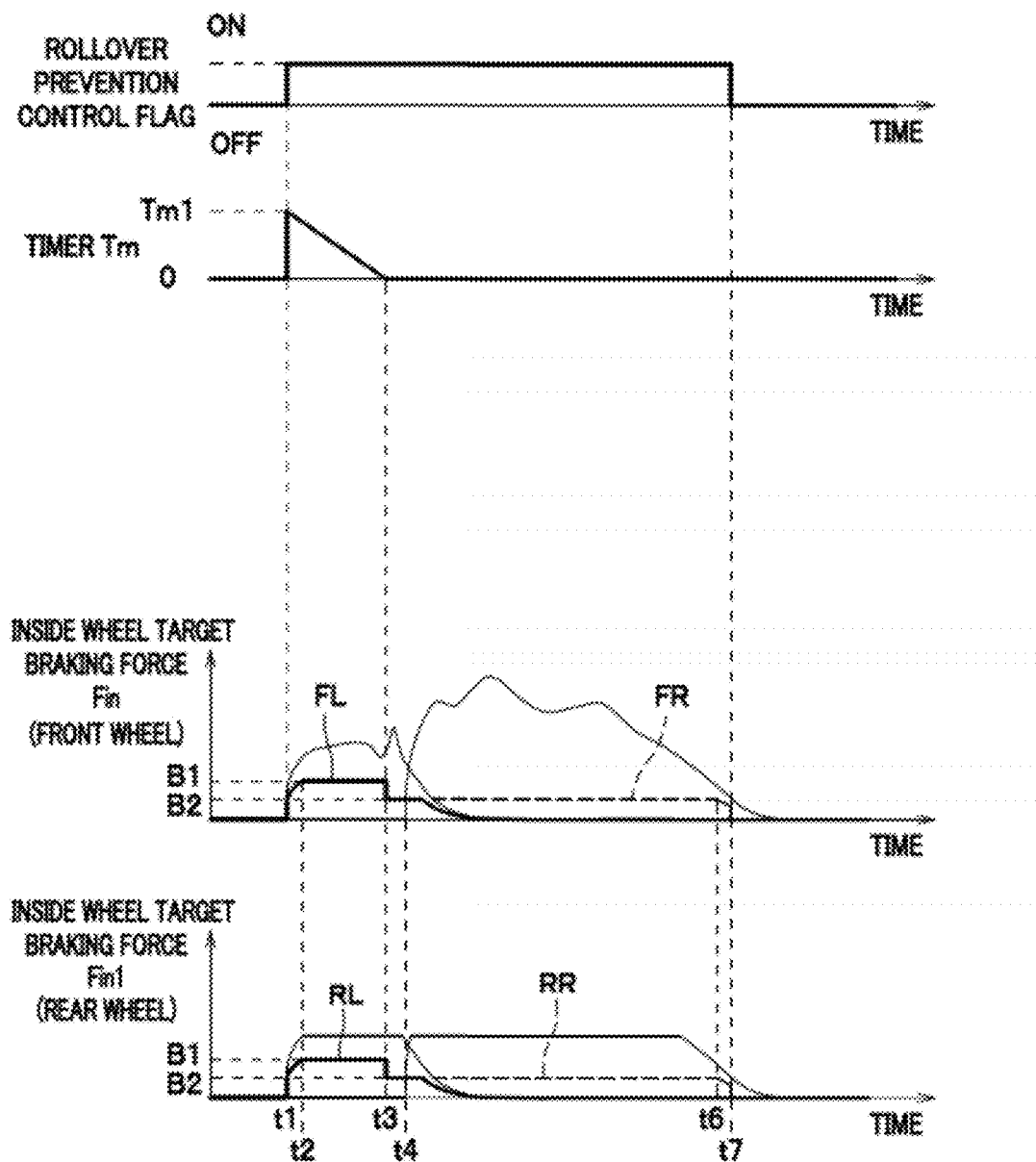

BRAKE FLUID PRESSURE CONTROL APPARATUS FOR VEHICLE

CROSS REFERENCE TO RELATED APPLICATIONS

This application claims the foreign priority benefit under Title 35, United States Code, §119(a)-(d) of Japanese Patent Application Nos. 2011-036439, 2011-036110, and 2011-036441 filed on Feb. 22, 2011 in the Japan Patent Office, the disclosures of which are herein incorporated by reference in its entirety.

BACKGROUND OF THE INVENTION

The present invention relates to a brake fluid pressure control apparatus for a vehicle, and more particularly to a brake fluid pressure control apparatus for a vehicle, which controls brake to prevent rollover of the vehicle.

As disclosed in JP2001-509448A (hereinafter referred to as Patent Literature 1), there is known a technique for preventing rollover of a vehicle by applying a braking force to at least one wheel to stabilize the vehicle when a driver steers the vehicle into a sharp turn and the vehicle is about to roll over.

As disclosed in JP10-081215A (hereinafter referred to as Patent Literature 2), there is blown a technique for preventing rollover of a vehicle by applying braking forces only to turning outside wheels (i.e., wheels which are on the outside during cornering) to stabilize the vehicle when a driver steers the vehicle into a sharp turn and the vehicle is about to roll over, so that a lateral friction between the road surface and the tires can be reduced.

A vehicle is liable to roll over due to counteraction of roll, particularly when the driver steers back the steering wheel of a vehicle which is turning in one direction to the opposite direction so as to cause the vehicle to turn in the opposite direction. For the purpose of stabilizing the vehicle after such a steering-back maneuver, JP2007-513002A (hereinafter referred to as Patent Literature 3) discloses a technique for applying preparatory brake to turning inside wheels (i.e., wheels which are on the inside during cornering) after the driver executes the steering-back maneuver.

<First Drawback>

According to the technique disclosed in Patent Literature 1, an accelerometer for measuring a lateral acceleration, a measuring instrument for measuring a roll angle of the vehicle, and other instruments are used as sensors for detecting whether or not the vehicle is likely to roll over.

However, measuring physical quantities such as a lateral acceleration and a roll angle, which are equivalent to the actual roll angle of the vehicle, and then determining whether or not the vehicle is likely to roll over based on the measurement result may disadvantageously result in a drawback that the rollover prevention control will not sufficiently act on the vehicle if a rollover tendency of the vehicle increases more abruptly than normal. For example, if the driver of the vehicle executes an abrupt steering maneuver or a steering-back maneuver while the vehicle is turning, the vehicle is liable to roll over due to rolling-back of the vehicle generated after the steering maneuver. It would be desirable to provide a brake fluid pressure control apparatus for a vehicle, which can determine the rollover tendency of the vehicle at a timing as early as possible to promptly initiate the rollover prevention control.

<Second Drawback>

According to the technique disclosed in Patent Literature 1, the rollover tendency of the vehicle is detected by comparing measurements of various sensors indicating the roll angle or a measurement of a lateral acceleration sensor which changes with the same phase as the actual roll angle with predetermined threshold values.

However, the liability to cause the vehicle to roll over highly depends on whether the roll angle is gradually increasing or abruptly increasing, even if the roll angle takes the same value. Therefore, if the rollover tendency is detected only by determining whether a value equivalent to the roll angle reaches the predetermined threshold value and the rollover prevention control is initiated based on this determination, it is impossible to effectively perform the rollover prevention control in the case where the roll angle abruptly increases and the vehicle is more liable to roll over.

<Third Drawback>

According to the techniques disclosed in Patent Literatures 2 and 3, it is impossible to promptly increase braking forces at the wheels which are on the outside after the steering-back maneuver (i.e., wheels which are on the inside before the steering-back maneuver), when the driver makes a steering-back maneuver while the vehicle is turning. The technique disclosed in Patent Literature 3 is better than that disclosed in Patent Literature 2 because preparatory brake is applied after the steering-back maneuver. However, it is after the steering-back maneuver that the preparatory brake is applied to the turning inside wheels, and therefore the braking forces at the wheels which are on the outside after the steering-back maneuver do not always increase sufficiently. Further, in this technique, the preparatory brake is applied for a short period of time, which contributes little to reducing the vehicle speed that is one of important factors to prevent rollover of the vehicle.

In view of the above, it would be desirable to provide a brake fluid pressure control apparatus, which can overcome one or more of the above drawbacks and improve the stability while driving the vehicle.

SUMMARY OF THE INVENTION

According to a first aspect of the present invention, the above first drawback is overcome by providing a brake fluid pressure control apparatus for executing rollover prevention control, in which brake is applied to at least one wheel of a vehicle at a timing when a rollover tendency of the vehicle is detected through a rollover detection parameter while the vehicle is turning. The brake fluid pressure control apparatus comprises: a parameter calculation unit configured to calculate the rollover detection parameter; and a steering maneuver determination unit configured to determine whether or not an abrupt steering maneuver is made, wherein the parameter calculation unit is configured to calculate a first composition roll angle as the rollover detection parameter, by combining at a predetermined weight assignment ratio a first roll angle equivalent to an actual roll angle with a second roll angle obtained using a parameter which changes with a phase earlier than the first roll angle, and wherein the parameter calculation unit calculates the first composition roll angle by changing the weight assignment ratio such that a weight of the second roll angle is higher when the steering maneuver determination unit determines that an abrupt steering maneuver is made than when the steering maneuver determination unit determines that the abrupt steering maneuver is not made.

With this configuration of the brake fluid pressure control apparatus, when the driver makes an abrupt steering maneuver, instead of calculating the rollover detection parameter only from the first roll angle equivalent to the actual roll angle, the parameter calculation unit calculates the first composition roll angle (rollover detection parameter) by combining the first roll angle and the second roll angle such that the distribution ratio (weight) of the second roll angle which changes with a phase earlier than the first roll angle increases with respect to the first roll angle. By this way, if an abrupt steering maneuver is made, the rollover detection parameter changes at a timing slightly earlier than the actual roll angle, with the result that the rollover tendency of the vehicle can be detected at a timing earlier than the conventional method, because the rollover tendency is determined based on this rollover detection parameter. Therefore, it is possible to predict the rollover tendency of the vehicle at a timing earlier than the conventional method and thus to further improve the postural stability of the vehicle, in the case where the rollover tendency increases rapidly as the result of an abrupt steering maneuver. It should be noted that the first roll angle equivalent to the actual roll angle is a physical quantity substantially accurately reflecting the actual roll angle; for example, a roll angle detected by a roll angle sensor, and a roll angle calculated from a constant depending on a lateral acceleration and roll characteristics of the vehicle are equivalent to the first roll angle.

The above brake fluid pressure control apparatus may further comprise a steering-back maneuver determination unit configured to determine whether or not an abrupt steering-back maneuver is made, and wherein the parameter calculation unit is configured to calculate a second composition roll angle as the rollover detection parameter, by combining at a predetermined weight assignment ratio a third roll angle obtained from a parameter which changes with a phase earlier than the first roll angle and the second roll angle with the first composition roll angle, and wherein the parameter calculation unit calculates the second composition roll angle by changing the weight assignment ratio such that a weight of the third roll angle is higher when the steering-back maneuver determination unit determines that an abrupt steering-back maneuver is made than when the steering-back maneuver determination unit determines that the abrupt steering-back maneuver is not made.

With this configuration of the brake fluid pressure control apparatus, the second composition roll angle (rollover detection parameter) is calculated by combining the third roll angle obtained from a parameter which changes with a phase earlier than the first roll angle and the second roll angle with the first roll angle. In this calculation, the distribution ratio (weight) of the third roll angle is higher when the steering-back maneuver determination unit determines that an abrupt steering-back maneuver is made than when the steering-back maneuver determination unit determines that the abrupt steering-back maneuver is not made, with the result that the rollover tendency of the vehicle can be determined at a timing much earlier than the conventional method. Therefore, it is possible to predict the rollover tendency of the vehicle at a timing earlier than the conventional method and thus to further improve the postural stability of the vehicle, in the case where the rollover tendency increases rapidly as the result of a steering-back maneuver.

In the above brake fluid pressure control apparatus, the steering maneuver determination unit may determine that an abrupt steering maneuver is made, if an absolute value of a steering wheel turning speed is equal to or greater than a predetermined value, and an absolute value of a lateral acceleration is equal to or greater than a predetermined value. Instead of using the absolute value of the steering wheel turning speed, it is possible to use a filtered absolute value of a lateral acceleration resulting from a filtering process by which a decrease of the absolute value of the lateral acceleration is retarded.

In the above brake fluid pressure control apparatus, the parameter calculation unit may comprise a first counter configured to increase a first count value if the steering maneuver determination unit determines that an abrupt steering maneuver is made, and to decrease the first count value if the steering maneuver determination unit determines that an abrupt steering maneuver is not made, and a first weight coefficient setting unit configured to set a first weight coefficient, which is equivalent to the weight of the second roll angle, in accordance with the first count value and in a range equal to or smaller than a predetermined upper limit value, and wherein the first counter increases the first count value even after the first weight coefficient reaches the predetermined upper limit value.

With this configuration of the brake fluid pressure control apparatus, even after the first weight coefficient reaches the predetermined upper limit value, the first count value is increased if the steering wheel turning speed is greater than a predetermined value. After that, even if the first counter decreases the first count value, the first weight coefficient maintains the upper limit value until the first count value decreases to a value corresponding to the predetermined upper limit value of the first weight coefficient. It is therefore possible to improve a rollover prevention effect after the end of an abrupt steering maneuver.

In the above brake fluid pressure control apparatus, signs of values may be defined by assigning first signs respectively to a value of a steering angle when the steering wheel is turned left, values of a lateral acceleration acting on the vehicle and a roll angle exhibited while the vehicle is stably turning left, and a value of a roll rate exhibited when the roll angle takes a greater value due to a left turn of the vehicle, and by assigning second signs respectively to a value of a steering angle when the steering wheel is turned right, values of a lateral acceleration acting on the vehicle and a roll angle exhibited while the vehicle is stably turning right, and a value of a roll rate exhibited when the roll angle takes a greater value due to a right turn of the vehicle, and the steering-back maneuver determination unit determines that an abrupt steering-back maneuver is made if all of the following conditions are satisfied:

(1) one of values of the steering angle and the lateral acceleration has the first sign, while the other one of the values has the second sign;

(2) one of values of the first roll angle and a first roll rate calculated from the first roll angle has the first sign, while the other one of the values has the second sign, or/and one of values of the second roll angle and a second roll rate calculated from the second roll angle has the first sign, while the other one of the values has the second sign; and (3) an absolute value of the first roll rate that satisfies the above condition (2) is equal to or greater than a predetermined value or/and an absolute value of the second roll rate that satisfies the above condition (2) is equal to or greater than a predetermined value.

Further, the parameter calculation unit may comprise a second counter configured to increase a second count value if the steering-back maneuver determination unit determines that an abrupt steering-back maneuver is made, and to decrease the second count value if the steering-back maneuver determination unit determines that an abrupt steering-back maneuver is not made, and a second weight coefficient setting unit configured to set a second weight coefficient, which is equivalent to the weight of the third roll angle, in accordance with the second count value and in a range equal to or smaller than a predetermined upper limit value, and wherein the second counter increases the second count value even after the second weight coefficient reaches the predetermined upper limit value.

With this configuration of the brake fluid pressure control apparatus, even after the second weight coefficient reaches the predetermined upper limit value, the second count value is increased if an abrupt steering-back maneuver is made. After that, even if the second counter decreases the second count value, the second weight coefficient maintains the upper limit value until the second count value decreases to a value corresponding to the predetermined upper limit value of the second weight coefficient. It is therefore possible to improve a rollover prevention effect, particularly after the end of a steering-back maneuver.

In the above brake fluid pressure control apparatus, for example, the first roll angle is calculated from a lateral acceleration, and the second roll angle is calculated from a yaw rate. Further, the third roll angle may be calculated from a steering angle.

According to a second aspect of the present invention, the above second drawback is overcome by providing a brake fluid pressure control apparatus for executing rollover prevention control, in which brake is applied to at least one wheel of a vehicle at a timing when a rollover tendency of the vehicle is detected from a rollover detection parameter greater than a parameter threshold value while the vehicle is turning. The brake fluid pressure control apparatus comprises: a parameter acquisition unit configured to acquire the rollover detection parameter; and a parameter calculation unit configured to set the parameter threshold value, wherein the parameter acquisition unit acquires a roll angle of the vehicle as the rollover detection parameter, and wherein the parameter calculation unit calculates a threshold calculation roll rate, which is a rate of change of the roll angle of the vehicle, and sets the parameter threshold value to a smaller value with an increase in the threshold calculation roll rate.

With this configuration of the brake fluid pressure control apparatus, the parameter calculation unit sets the parameter threshold value to a smaller value with an increase in the threshold calculation roll rate. In the case where the threshold calculation roll rate is greater, the parameter threshold value is smaller accordingly, so that the rollover detection parameter is apt to be greater than the parameter threshold value. As a result, the rollover prevention control can be initiated promptly under such a condition that the vehicle is apt to roll over due to rapidly increased roll angle. This can improve the stability while driving the vehicle.

It should be noted that the roll angle obtained by the parameter acquisition unit may be a value obtained by measurement of a roll angle sensor, or a roll angle as an estimate value obtained by calculation from other parameters such as a lateral acceleration, a yaw rate, and a steering angle.

The above brake fluid pressure control apparatus may further comprises an instability level calculation unit configured to calculate an instability level which shows a greater value when a running condition of the vehicle is unstable, and the parameter calculation unit may set the threshold calculation roll rate to zero if the instability level is smaller than a predetermined value.

With this configuration of the brake fluid pressure control apparatus, the threshold calculation roll rate is set to zero when the instability level is smaller than the predetermined value, namely when the vehicle behavior is not so unstable, with the result that the parameter threshold value increases to prevent unnecessary rollover prevention control.

The above brake fluid pressure control apparatus may further comprises a steering maneuver determination unit configured to determine whether or not an abrupt steering maneuver is made, and the parameter calculation unit may be configured to calculate a composition roll rate as the threshold calculation roll rate, by combining at a predetermined weight assignment ratio a first roll rate which is a rate of change of a first roll angle equivalent to an actual roll angle with a second roll rate which is a rate of change of a second roll angle obtained using a parameter which changes with a phase earlier than the first roll angle, and to calculate the composition roll rate by changing the weight assignment ratio such that a weight of the second roll rate is higher when the steering maneuver determination unit determines that an abrupt steering maneuver is made than when the steering maneuver determination unit determines that the abrupt steering maneuver is not made.

With this configuration of the brake fluid pressure control apparatus, when the driver makes an abrupt steering maneuver, instead of calculating the parameter threshold value only from the first roll rate which is a rate of change of the first roll angle equivalent to the actual roll angle, the parameter calculation unit calculates the composition roll rate (i.e., threshold calculation roll rate for calculating the parameter threshold value) by increasing the distribution ratio (weight) of the second roll rate which is a rate of change of the second roll angle obtained using a parameter which changes with a phase earlier than the first roll angle, and then combining the first roll rate and the second roll rate using this distribution ratio. By this way, if an abrupt steering maneuver is made, the parameter threshold value changes at a timing slightly earlier than the actual roll angle, with the result that the rollover tendency of the vehicle can be detected at a timing earlier than the conventional method, because the rollover tendency is determined based on this parameter threshold value. Therefore, it is possible to predict the rollover tendency of the vehicle at a timing earlier than the conventional method and thus to further improve the postural stability of the vehicle, in the case where the rollover tendency increases rapidly as the result of an abrupt steering maneuver. It should be noted that the first roll angle equivalent to the actual roll angle is a physical quantity substantially accurately reflecting the actual roll angle: for example, a roll angle detected by a roll angle sensor, and a roll angle calculated from a constant depending on a lateral acceleration and roll characteristics of the vehicle are equivalent to the first roll angle.

In the above brake fluid pressure control apparatus, the first roll angle may be calculated from a lateral acceleration, and the second roll angle may be calculated from a yaw rate.

With this configuration of the brake fluid pressure control apparatus, the first roll angle and the second roll angle are obtained using measurements from sensors normally equipped in the brake fluid pressure control apparatus.

In the above brake fluid pressure control apparatus, the steeling maneuver determination unit may determine that an abrupt steering maneuver is made, if an absolute value of a steering wheel turning speed is equal to or greater than a predetermined value, and an absolute value of a lateral acceleration is equal to or greater than a predetermined value. Instead of using the absolute value of the steering wheel turning speed, it is possible to use a filtered absolute value of a lateral acceleration resulting from a filtering process by which a decrease of the absolute value of the lateral acceleration is retarded.

In the above brake fluid pressure control apparatus, the parameter calculation unit may comprise a counter configured to increase a count value if the steering maneuver determination unit determines that an abrupt steering maneuver is made, and to decrease the count value if the steering maneuver determination unit determines that an abrupt steering maneuver is not made, and a weight coefficient setting unit configured to set a weight coefficient, which is equivalent to the weight of the second roll rate, in accordance with the count value and in a range equal to or smaller than a predetermined upper limit value. The counter may increase the count value even after the weight coefficient reaches the predetermined upper limit value.

With this configuration of the brake fluid pressure control apparatus, even after the weight coefficient reaches the predetermined upper limit value, the count value is increased if the steering wheel turning speed is greater than a predetermined value. After that, even if the counter decreases the count value, the weight coefficient maintains the upper limit value until the count value decreases to a value corresponding to the predetermined upper limit value of the weight coefficient. It is therefore possible to improve a rollover prevention effect after the end of an abrupt steering maneuver.

In the above brake fluid pressure control apparatus, the parameter calculation unit may calculate a threshold calculation roll rate, which is a rate of change of the roll angle of the vehicle, and set the parameter threshold value to a smaller value with an increase in a filtered absolute value of the threshold calculation roll rate resulting from a filtering process by which a decrease of the absolute value of the threshold calculation roll rate is retarded.

According to a third aspect of the present invention, the above third drawback is overcome by providing a brake fluid pressure control apparatus capable of applying brake individually to right and left wheels of a vehicle arranged on the same axle, and configured to execute rollover prevention control, in which brake is applied to at least one wheel of the vehicle at a timing when a rollover tendency of the vehicle is detected while the vehicle is turning. If the rollover tendency is detected, the brake fluid pressure control apparatus operates such that a first braking force is applied to a tuning outside wheel and at the same time a second braking force smaller than the first braking force is applied to a turning inside wheel arranged on the same axle and that an application of the first braking force is initiated at the same timing as an application of the second braking force With this configuration of the brake fluid pressure control apparatus, if the rollover tendency of the vehicle is detected, the first braking force is applied to the turning outside wheel, and "at the same time," the second braking force smaller than the first braking force is applied to the turning inside wheel (hereinafter simply referred to as an "inside wheel") arranged on the same axle, and the application of the first braking force is initiated at the same timing as the application of the second braking force, with the result that the turning outside wheel (hereinafter simply referred to as an "outside wheel") receives a greater braking force than the turning inside wheel does. This can restrict the rollover tendency irrespective of whether or not subsequent steering-back maneuver is made. And even if a subsequent steering-back maneuver is made, the brake pressure on the outside wheel can be promptly increased after the steering-back maneuver, so that a rollover of the vehicle can be effectively prevented. This is because a certain level of braking force has been applied to the turning inside wheel (turning outside wheel after the steering-back maneuver).

Braking force is applied not only to the outside wheel but also to the inside wheel before the steering-back maneuver, so that the vehicle speed is effectively reduced to prevent the rollover of the vehicle. Namely, the roll angle directly indicating the rollover tendency depends on the vehicle speed and is apt to be greater with an increase in the vehicle speed. Therefore, reducing the vehicle speed can serve to prevent the rollover of the vehicle. Further, with this configuration, the vehicle speed is reduced before the steering-back maneuver is made, by making use of the braking force applied to the inside wheel. It is therefore possible to effectively prevent the rollover of the vehicle after the driver executes the steering-back maneuver.

The above brake fluid pressure control apparatus may further comprise an outside wheel target braking force setting unit configured to set an outside wheel target braking force as a target for braking the turning outside wheel with the first braking force, and an inside wheel target braking force setting unit configured to set an inside wheel target braking force as a target for braking the turning inside wheel with the second braking force, using a value smaller than that of the outside wheel target braking force.

In the above brake fluid pressure control apparatus, the rollover prevention control may be carried out if a rollover detection parameter indicating the rollover tendency is greater than a predetermined threshold value, and the outside wheel target braking force setting unit may set the outside wheel target braking force based on a difference between the rollover detection parameter and the predetermined threshold value.

The greater the difference between the rollover detection parameter indicating the rollover tendency of the vehicle and the predetermined threshold value for determining whether or not the rollover prevention control is carried out, the higher the possibility of the rollover of the vehicle is. Therefore, setting the outside wheel target braking force based on this difference makes it possible to perform the rollover prevention control in accordance with the possibility of rollover.

In the above brake fluid pressure control apparatus, if a predetermined value is smaller than a multiplication value obtained by multiplying the outside wheel target braking force by a coefficient smaller than 1, the inside wheel target braking force setting unit may set the predetermined value as the inside wheel target braking force, and if the predetermined value is not smaller than the multiplication value, the inside wheel target braking force setting unit may set the multiplication value as the inside wheel target braking force.

With this configuration of the brake fluid pressure control apparatus, since the inside wheel target braking force is generally set to the predetermined value, it is possible to prevent a delay of increase in the braking force applied to the outside wheel after the steering-back maneuver, and hence a deceleration performance of the vehicle can be executed. If the braking force applied to the outside wheel is small, the braking force on the inside wheel is set to be smaller than that of the outside wheel, so that a rollover prevention can be effectively performed in this case.

In the above brake fluid pressure control apparatus, the inside wheel target braking force setting unit may set a first predetermined value as the predetermined value for a predetermined period of time from initiating the rollover prevention control, and after an elapse of the predetermined period of time, sets a second predetermined value smaller than the first predetermined value as the predetermined value.

With this configuration of the brake fluid pressure control apparatus, the inside wheel target braking force is set to a greater value at an initial stage of the rollover prevention control. This can improve a rise time of the braking force and stabilize the vehicle.

In the above brake fluid pressure control apparatus, the rollover prevention control may be performed on both front and rear wheels, and the outside wheel target braking force setting unit may set an outside wheel target braking force for the rear wheels such that the outside wheel target braking force is set within a third predetermined value.

With this configuration of the brake fluid pressure control apparatus, since braking forces are applied to front and rear wheels, the vehicle speed can be reduced promptly to improve the rollover prevention control. Further, since the upper limit value is provided for the braking force on the rear-side outside wheel which is liable to slip, an initiation of unnecessary braking force can be avoided.

BRIEF DESCRIPTION OF THE DRAWINGS

Other objects and aspects of the present invention will become more apparent by describing in detail illustrative, non-limiting embodiments thereof with reference to the accompanying drawings, in which:

FIG. 9 is a flow chart explaining a process for calculating a second weight coefficient;

FIG. 10 is a flow chart explaining a process for setting a roll angle threshold value;

FIG. 11 is a flow chart explaining a process for calculating an outside wheel target braking force;

FIG. 12 is a flow chart explaining a process for calculating an inside wheel target braking force;

FIG. 13 explains a process for calculating a first composition roll angle, and shows time charts of various parameters;

FIG. 14 explains a process for calculating a second composition roll angle, and shows time charts of various parameters;

FIG. 15 explains a process for calculating a composition roll rate, and shows time charts of various parameters;

FIG. 16 shows graphs explaining the calculation of the roll angle threshold value from the composition roll rate;

FIG. 19 shows time charts of the inside wheel target braking force;

DETAILED DESCRIPTION OF THE INVENTION

With reference to the attached drawings, a preferred embodiment of the present invention will be described.

Figure 1:
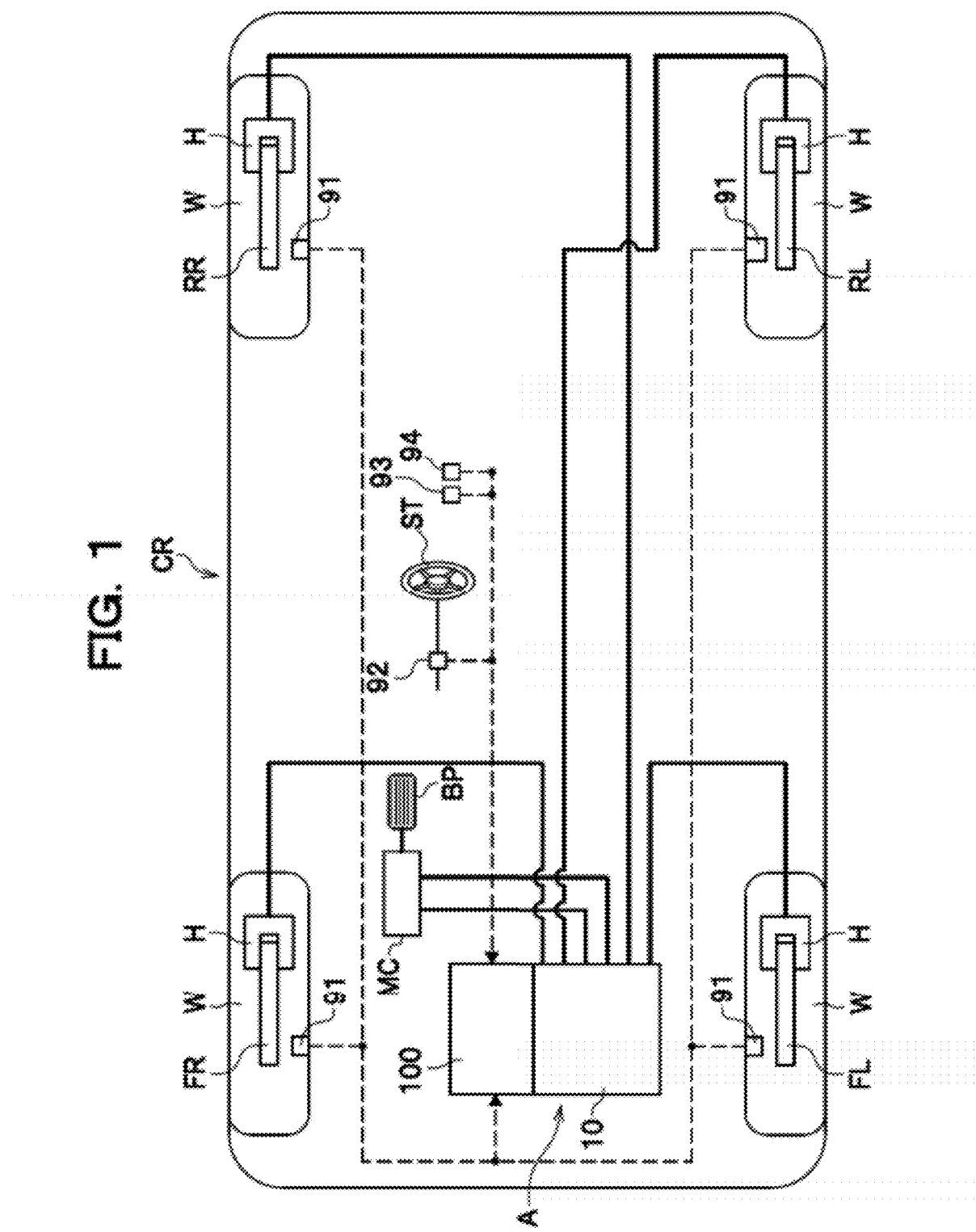
FIG. 1 is a block diagram of a vehicle in which a brake fluid pressure control apparatus according to one embodiment of the present invention is installed.

As seen in FIG. 1, a brake fluid pressure control apparatus A for a vehicle CR controls a braking force (brake fluid pressure) applied to each wheel W of the vehicle CR where appropriate. The brake fluid pressure control apparatus A comprises a fluid pressure unit 10 in which brake fluid passages (fluid pressure passages) and various parts are provided, and a controller 100 for appropriately controlling the various parts within the fluid pressure unit 10.

Connected to the controller 100 of the brake fluid pressure control apparatus A are wheel speed sensors 91 each for detecting wheel speed of a wheel W, a steering angle sensor 92 for detecting steering angle of a steering wheel ST, a lateral acceleration sensor 93 for detecting acceleration acting in a lateral direction of the vehicle CR (i.e., lateral acceleration), and a yaw rate sensor 94 for detecting turning angular velocity (i.e., actual yaw rate) of the vehicle CR. These sensors 91-94 output detection signals to the controller 100.

The controller 100 includes a CPU, a RAM, a ROM, an input/output circuit, etc. The controller 100 performs various arithmetic operations based on input signals from the wheel speed sensors 91, the steering angle sensor 92, the lateral acceleration sensor 93, and the yaw rate sensor 94, and also based on programs or data stored in the ROM, so as to execute the control.

A wheel cylinder H is a hydraulic device which converts brake fluid pressure generated in a master cylinder MC and the brake fluid pressure control apparatus A into actuating force for a wheel brake FR, FL, RR, RL of each wheel W. In this exemplary embodiment, four wheel cylinders H are connected to the fluid pressure unit 10 of the brake fluid pressure control apparatus A through piping.

Figure 2:
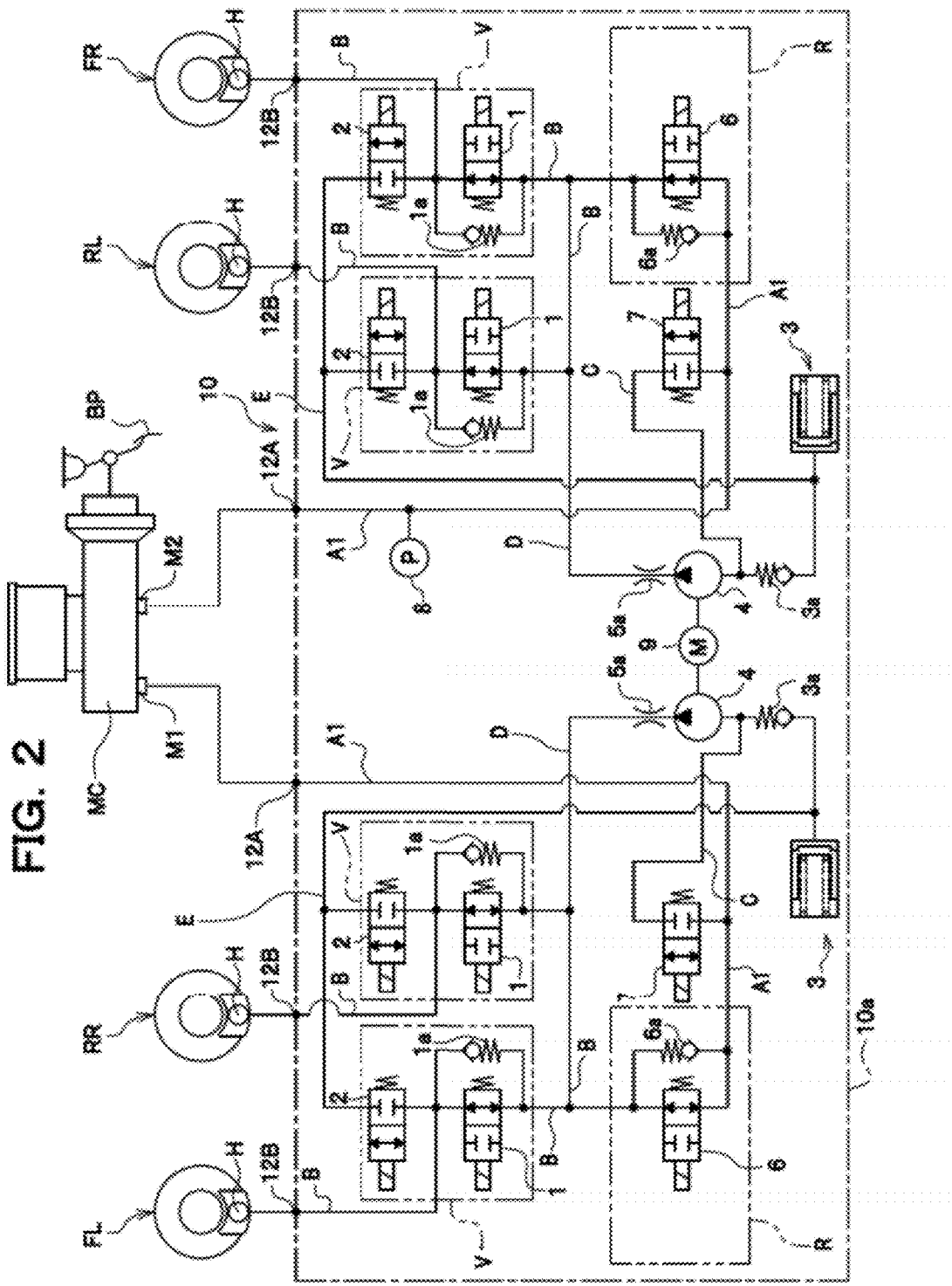
FIG. 2 is a diagram showing a fluid pressure unit of the brake fluid pressure control apparatus.

As seen in FIG. 2, the fluid pressure unit 10 of the brake fluid pressure control apparatus A is arranged between the master cylinder MC and the wheel brakes FR, FL, RR, RL. In the master cylinder MC, brake fluid pressure which varies with the driver's brake pedal depression force is generated. The fluid pressure unit 10 includes a pump body 10a which is a base body having brake fluid passages for brake fluid, a plurality of inlet valves 1 and outlet valves 2 arranged on the brake fluid passages, and other components.

Two output ports M1, M2 of the master cylinder MC are connected to two input ports 12A of the pump body 10a, and output ports 12B of the pump body 10a are connected to the wheel brakes FL, RR, RL, FR. Normally, the brake fluid passages from the input ports 12A to the output ports 12B within the pump body 10a provide a fluid communication so that when the driver depresses a brake pedal BP, the brake pedal depression force is transmitted to the wheel brakes FL, RR, RL, FR.

Herein, the brake fluid passage extending from the output port M1 to the wheel brake FL at the front left wheel and the wheel brake RR at the rear right wheel is referred to as a "first brake system" whereas the brake fluid passage extending from the output port M2 to the wheel brake FR at the front right wheel and the wheel brake RL at the rear left wheel is referred to as a "second brake system."

The fluid pressure unit 10 includes two control valve units V in the first brake system corresponding to the wheel brakes FL, RR, and similarly two control valve units V in the second brake system corresponding to the wheel brakes RL, FR. In this fluid pressure unit 10, each of the first and second brake systems includes a reservoir 3, a pump 4, an orifice 5a, a pressure regulating valve (regulator) R, and a suction valve 7. Further, the fluid pressure unit 10 includes a motor 9 for driving both the pump 4 in the first brake system and the pump 4 in the second brake system. The motor 9 is of a speed control type. In this exemplary embodiment, a pressure sensor 8 is provided only in the second brake system.

In the following description, the brake fluid passage extending from the output port M1, M2 of the master cylinder MC to each pressure regulating valve R is referred to as an "output fluid pressure passage A1", and the brake fluid passage extending from the pressure regulating valve R in the first brake system to the wheel brakes FL, RR and the brake fluid passage extending from the pressure regulating valve R in the second brake system to the wheel brakes RL. FR are both referred to as a "wheel fluid pressure passage B." The brake fluid passage extending from the output fluid pressure passage A1 to the pump 4 is referred to as a "suction fluid pressure passage C", the brake fluid passage extending from the pump 4 to the wheel fluid pressure passage B is referred to as a "discharge fluid pressure passage D", and the brake fluid passage extending from the wheel fluid pressure passage B to the suction fluid pressure passage C is referred to as a "release passage E."

The control valve unit V controls a flow of fluid from the master cylinder MC or the pump 4 to the wheel brakes FL, RR, RL, FR (specifically, the wheel cylinders H) and vice versa, so that the pressure within the wheel cylinder H can be increased, maintained or decreased. For this purpose, the control valve unit V includes an inlet valve 1, an outlet valve 2, and a check valve 1a.

The inlet valve 1 is a normally open solenoid valve provided between each of the wheel brakes FL, RR, RL, FR and the master cylinder MC, namely in the wheel fluid pressure passage B. The inlet valve 1 is a normally open to allow transmission of brake fluid pressure from the master cylinder MC to each of the wheel brakes FL, RR, RL, RR. However, if the wheel W is almost locked, the inlet valve 1 is closed under control of the controller 100 to shut off the transmission of brake fluid pressure from the brake pedal BP to each of the wheel brakes FL, FR, RL, RR.

The outlet valve 2 is a normally closed solenoid valve provided between each of the wheel brakes FL, RR, RL, FR and the reservoirs 3, namely between the wheel fluid pressure passage B and the release passage E. The outlet valve 2 is normally closed. However, if the wheel W is almost locked, the outlet valve 2 is opened under control of the controller 100 to release the brake fluid pressure acting on each of the wheel brakes FL, FR, RL, RR to the reservoirs 3.

The check valve 1a is connected in parallel to each of the inlet valves 1. The check valve 1a is a one-way valve which only allows a flow of brake fluid from each of the wheel brakes FL, FR, RL, RR to the master cylinder MC. When the brake pedal depression force is released at the brake pedal BP, even if the inlet valve 1 is closed, the check valve 1a allows a flow of brake fluid from each wheel brake FL, FR, RL, RR to the master cylinder MC.

The reservoir 3 is provided in the release passage E, and when each of the outlet valves 2 is released, brake fluid released from the outlet valve 2 flows into the reservoir 3 to absorb brake fluid pressure. Provided between the reservoir 3 and the pump 4 is a check valve 3a, which only allows a flow of brake fluid from the reservoir 3 to the pump 4.

The pump 4 is provided between the suction fluid pressure passage C in communication with the output fluid pressure passage A1 and the discharge fluid pressure passage D in communication with the wheel fluid pressure passage B. The pump 4 sucks brake fluid stored in the reservoir 3 and feeds the brake fluid to the discharge fluid pressure passage D. Therefore, the pump 4 can return the brake fluid stored in the reservoir 3 to the master cylinder MC and can generate brake fluid pressure so that a braking force is generated at each of the wheel brakes FL, RR, RL, FR without requiring the brake pedal operation of the driver.

The pump 4 discharges brake fluid at a predetermined discharge rate which depends on the rotation speed of the motor 9. To be more specific, the pump 4 discharges brake fluid at a greater discharge rate as the rotation speed of the motor 9 increases.

The orifice 5a operates to attenuate pressure pulsation of the brake fluid discharged from the pump 4 as well as to attenuate pulsation generated upon actuation of the pressure regulating valve R to be described later.

The pressure regulating valve R is normally open to allow a flow of brake fluid from the output fluid pressure passage A1 to the wheel fluid pressure passage B. However, when the fluid pressure within the wheel cylinder H is to be increased using the brake fluid pressure generated by the pump 4, the pressure regulating valve R shuts off the flow of brake fluid and regulates fluid pressure in the discharge fluid pressure passage D, the wheel fluid pressure passage B and the wheel cylinder H to be equal to or lower than a setting value. For this purpose, the pressure regulating valve R includes a changeover valve 6 and a check valve 6a.

The changeover valve 6 is a normally open linear solenoid valve provided between the output fluid pressure passage A1 in communication with the master cylinder MC and the wheel fluid pressure passage B in communication with each of the wheel brakes FL, FR, RL, RR. Although not shown in detail in the drawings, the valve element of the changeover valve 6 is urged toward the wheel fluid pressure passage B and the wheel cylinder H by an electromagnetic force which varies with an electric current applied under control of the controller 100. When the fluid pressure in the wheel fluid pressure passage B increases to or beyond a predetermined value (the value being determined based on the applied electric current) which is higher than the fluid pressure in the output fluid pressure passage A1, brake fluid is released from the wheel fluid pressure passage B to the output fluid pressure passage A1 through the changeover valve 6, so that the fluid pressure within the wheel fluid pressure passage B is adjusted to a predetermined pressure.

The check valve 6a is connected in parallel to each of the changeover valves 6. The check valve 6a is a one-way valve for allowing a flow of brake fluid from the output fluid pressure passage A1 to the wheel fluid pressure passage B.

The suction valve 7 is a normally closed solenoid valve provided in the suction fluid pressure passage C so as to switch between a state where the suction fluid pressure passage C is opened and a state where the suction fluid pressure passage C is closed. The suction valve 7 is released (open) under control of the controller 100 when the changeover valve 6 is closed, that is, when brake fluid pressure is to be applied to each of the wheel brakes FL, FR, RL, RR while the driver does not operate the brake pedal BP.

The pressure sensor 8 detects brake fluid pressure in the output fluid pressure passage A1 in the second brake system. Detection results of the pressure sensor 8 are input to the controller 100.

Figure 3:
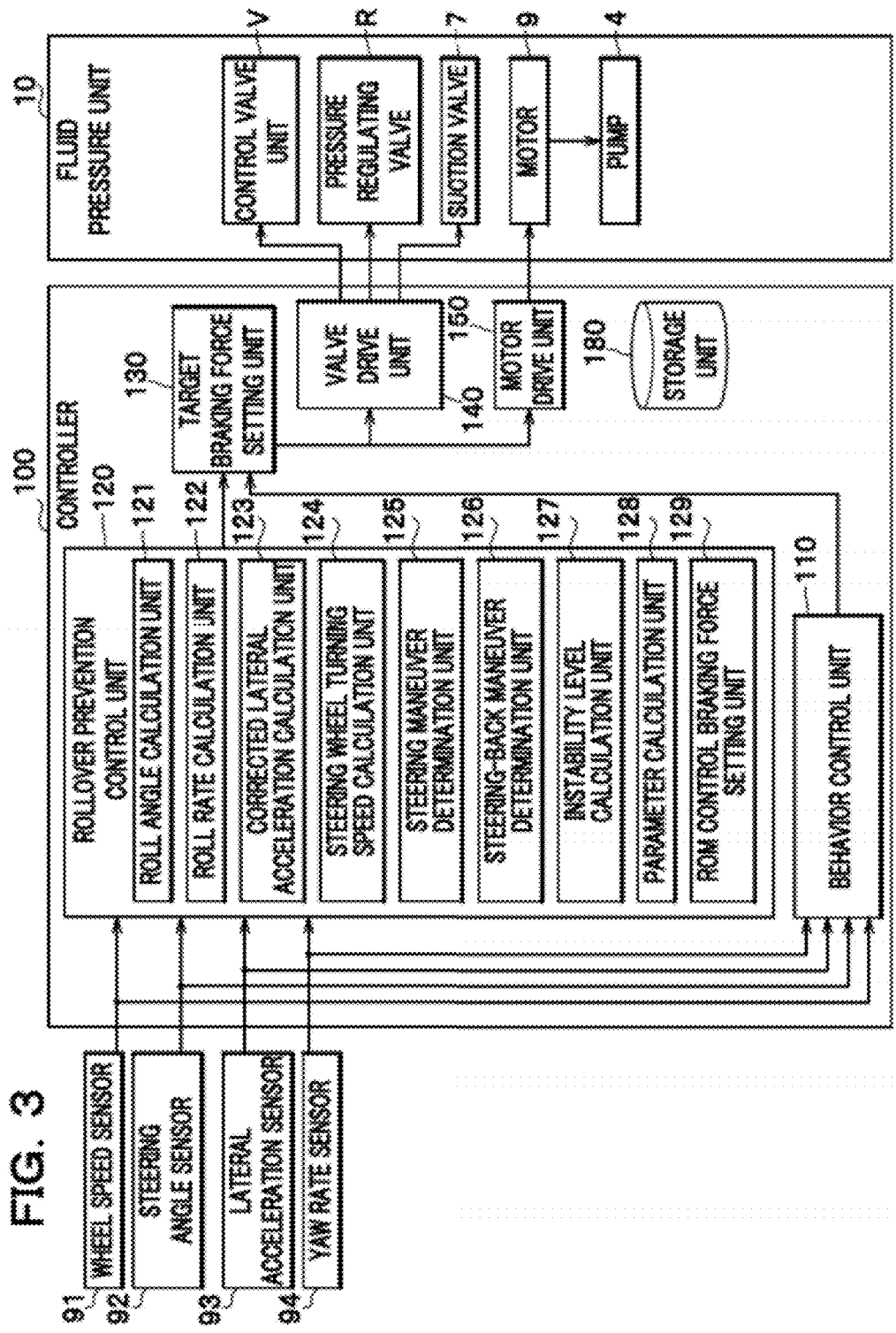
FIG. 3 is a block diagram illustrating the configuration of a controller.

Next, the controller 100 will be described in detail. As seen in FIG. 3, the controller 100 controls opening/closing operations of the control valve unit V, the changeover valve 6 (pressure regulating valve R) and the suction valve 7 in the fluid pressure unit 10 as well as the operation of the motor 9, based on the input signals from the sensors 91-94, to thereby control the operation of each of the wheel brakes FL, RR, RL, FR. The controller 100 includes as functional units a behavior control unit 110, a rollover prevention control unit 120, a target braking force setting unit 130, a valve drive unit 140, a motor drive unit 150, and a storage unit 180. The storage unit 180 stores predetermined constants, values detected by the sensors, and values calculated by the functional units, according to necessity.

The behavior control unit 110 is a known controller for stabilizing the behavior of the vehicle CR. The behavior control omit 110 executes a control for applying a braking force to one or more of the four wheels W. Braking forces calculated by the behavior control unit 110 and applied to the respective wheels W are output to the target braking force setting unit 130.

The rollover prevention control unit 120 is configured to execute a rollover prevention control, when a rollover tendency of the vehicle CR is detected through a rollover detection parameter while the vehicle CR is turning (cornering); the rollover prevention control is performed by applying a braking force to at least one wheel (in this embodiment, braking forces are applied individually to right and left wheels W arranged on the same axle). To be more specific, if the rollover tendency is detected, the rollover prevention control unit 120 operates such that a first braking force is applied to a turning outside wheel and at the same time a second braking force smaller than the first braking force is applied to a turning inside wheel arranged on the same axle and that an application of the first braking force is initiated at the same timing as an application of the second braking force. For this purpose, the rollover prevention control unit 120 includes a roll angle calculation unit 121, a roll rate calculation unit 122, a corrected lateral acceleration calculation unit 123, a steering wheel turning speed calculation unit 124, a steering maneuver determination unit 125, a steering-back maneuver determination unit 126, an instability level calculation unit 127, a parameter calculation unit 128, and a ROM (Rollover Mitigation) control braking force setting unit 129.

The roll angle calculation unit 121 calculates a lateral acceleration-based roll angle Ra1 as an example of a first roll angle, a yaw rate-based roll angle Ra2 as an example of a second roll angle, and a steering angle-based roll angle Ra3 as an example of a third roll angle. Calculation methods for these roll angles are already known in the art, and the roll angles can be calculated by the following expressions:

$$Ra1 = (Hg \times W \times Yg)/(Gf+Gr)$$

$$Ra2 = (Hg \times \omega \times Vx)/(Gf+Gr)$$

$$Ra3 = (Hg \times W \times \omega_\theta \times Vx)/(Gf+Gr)$$

where Hg is a distance in the vertical direction between a roll axis and the center of gravity; W is a sprung weight; Gf and Gr represent a roll stiffness; Yg represents a lateral acceleration; $\omega$ represents a yaw rate; $\omega_\theta$ represents a standard yaw rate (the standard yaw rate is calculated based on a steering angle and a vehicle speed Vx); and Vx represents a vehicle speed.

The roll rate calculation unit 122 calculates a lateral acceleration-based roll rate Ra1' from the lateral acceleration-based roll angle Ra1. The roll rate calculation unit 122 also calculates a yaw rate-based roll rate Ra2' from the yaw rate-based roll angle Ra2. Each of these roll rates can be obtained by calculating the rate of change in time of these roll angles.

The corrected lateral acceleration calculation unit 123 calculates a corrected lateral acceleration Ygm as a value for evaluating the lateral acceleration Yg; the corrected lateral acceleration Ygm is a filtered absolute value of the lateral acceleration Yg resulting from a filtering process by which a decrease of the absolute value of the lateral acceleration Yg is retarded. To be more specific, the calculation is made by taking the absolute value of the lateral acceleration Yg and then changing a value of the corrected lateral acceleration Ygm to be smaller than the previous value in a range of a predetermined rate of change such that, if the absolute value of the lateral acceleration Yg is increasing, the corrected lateral acceleration Ygm takes the same value as that of the absolute value of the lateral acceleration Yg, and if the absolute value of the lateral acceleration Yg is decreasing, the corrected lateral acceleration Ygm decreases less. See the graph showing corrected lateral acceleration of FIG. 13.

The steering wheel turning speed calculation unit 124 calculates the rate of change of the steering angle $\delta$ and then works out the steering wheel turning speed $\delta'$ by filtering the calculated value.

The steering maneuver determination unit 125 determines whether or not the driver executes an abrupt steering maneuver. To be more specific, the steering maneuver determination unit 125 determines that an abrupt steering is made, if the absolute value of the steering wheel turning speed $\delta'$ is equal to or greater than a predetermined value $\delta'$th and the absolute value of the corrected lateral acceleration Ygm is equal to or greater than a predetermined value Ygth.

The steering-back maneuver determination unit 126 determines whether or not the driver executes an abrupt steering-back maneuver. To be more specific, the steering-back maneuver determination unit 126 determines that an abrupt steering-back maneuver is made, if all of the following conditions are satisfied.

(1) Signs indicating right and left of the steeling angle $\delta$ are different from signs indicating right and left of the lateral acceleration Yg. Namely, supposing that signs of values are defined by assigning first signs (e.g., left) respectively to a value of the steering angle when the steering wheel is turned left, values of the lateral acceleration acting on the vehicle and the roll angle exhibited while the vehicle is stably turning left, and a value of the roll rate exhibited when the roll angle takes a greater value due to a left true of the vehicle, and by assigning second signs (e.g., right) respectively to a value of the steering angle when the steering wheel is turned right, values of the lateral acceleration acting on the vehicle and the roll angle exhibited while the vehicle is stably turning right, and a value of the roll rate exhibited when the roll angle takes a greater value due to a right turn of the vehicle, one of values of the steering angle $\delta$ and the lateral acceleration Yg has the first sign while the other one of the values has the second sign.

(2) One of values of the lateral acceleration-based roll angle Ra1 and the lateral acceleration-based roll rate Ra1' has the first sign while the other one of the values has the second sign.

(3) One of values of the yaw rate-based roll angle Ra2 and the yaw rate-based roll rate Ra2' has the first sign while the other one of the values has the second sign.

(4) The absolute value of the lateral acceleration-based roll rate Ra1' is equal to or greater than a predetermined value Ra1' th.

(5) The absolute value of the yaw rate-based roll rate Ra2' is equal to or greater than a predetermined value Ra2' th.

The instability level calculation unit 127 calculates an instability level of the running condition of the vehicle CR using a conventionally known method, based on an actual yaw rate Ys obtained with a conventional filtering technique by filtering an actual yaw rate detected by the yaw rate sensor 94 and a standard yaw rate Yc obtained with a conventional method from the steering angle δ and the vehicle speed Vx. To be more specific, the instability level calculation unit 127 obtains the instability level by filtering the difference between the actual yaw rate Ys and the standard yaw rate Yc (i.e., the result of the subtraction between the actual yaw rate Ys and the standard yaw rate Yc). The instability level shows a greater value when the running condition of the vehicle CR is unstable.

The parameter calculation unit 128 calculates a value (parameter) indicating the rollover tendency based on the values calculated by the various units described above. The parameter calculation unit 128 also calculates a threshold calculation roll rate which is a rate of change of the roll angle of the vehicle CR, and sets a roll angle threshold value Rath as a parameter threshold value to a smaller value with an increase in the threshold calculation roll rate.

The parameter calculation unit 128 calculates a first composition roll angle Ra12 by combining at a predetermined weight assignment ratio a first roll angle (the lateral acceleration-based roll angle Ra1) equivalent to the actual roll angle with a second roll angle (the yaw rate-based roll angle Ra2) obtained using a parameter which changes with a phase earlier than the first roll angle, and calculates the first composition roll angle Ra12 by changing the weight assignment ratio such that a weight of the second roll angle is higher when the steering maneuver determination unit 125 determines that an abrupt steering maneuver is made than when the steering maneuver determination unit 125 determines that the abrupt steering maneuver is not made.

The parameter calculation unit 128 also calculates a second composition roll angle Ra as the rollover detection parameter, by combining at a predetermined weight assignment ratio a third roll angle (the steering angle-based roll angle Ra3) obtained from a parameter which changes with a phase earlier than the first roll angle and the second roll angle with the first composition roll angle Ra12, and calculates the second composition roll angle Ra by changing the weight assignment ratio such that a weight of the third roll angle is higher when the steering-back maneuver determination unit 126 determines that an abrupt steering-back maneuver is made than when the steering-back maneuver determination unit 126 determines that the abrupt steering-back maneuver is not made.

Figure 4A:
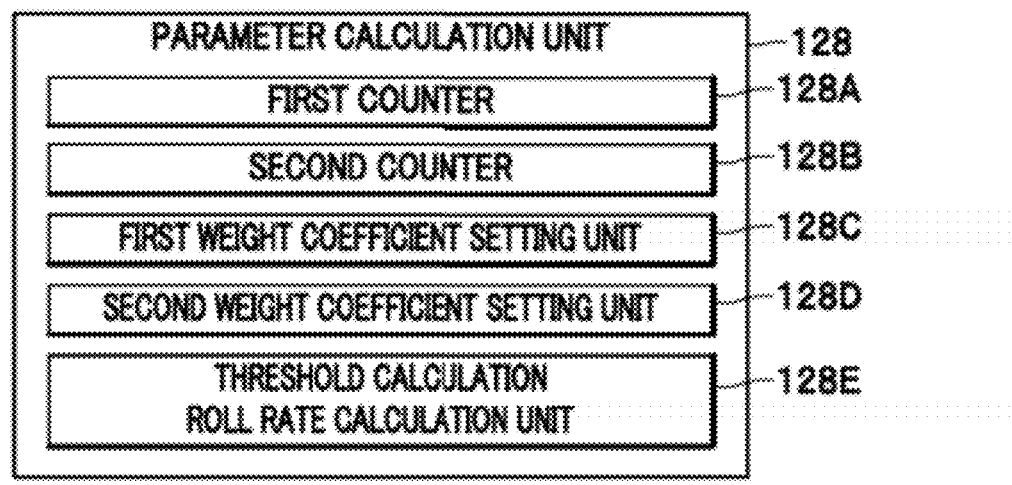
FIG. 4A is a block diagram illustrating the configuration of a parameter calculation unit.

According to this embodiment, a first weight coefficient K1 which changes according to the steering wheel turning speed is used as the predetermined weight assignment ratio for calculating the first composition roll angle Ra12, and a second weight coefficient K2 which changes according to an abrupt steering-back maneuver is used as the predetermined weight assignment ratio for calculating the second composition roll angle Ra. To this end, as seen in FIG. 4A, the parameter calculation unit 128 includes a first counter 128A, a second counter 128B, a first weight coefficient setting unit 128C, and a second weight coefficient setting unit 128D.

The first counter 128A increases (increments) a first count value C1 within a range of an upper limit value C1max if the steering maneuver determination unit 125 determines that an abrupt steering maneuver is made, and decreases (decrements) the first count value C1 if the steering maneuver determination unit 125 determines that an abrupt steering maneuver is not made. Values of the increment and the decrement may be same or different. In this embodiment, in order to leave the influence of an abrupt steering maneuver for a relatively longer period of time if the driver executes the abrupt steering maneuver, the value of the decrement is set smaller than the value of the increment. The first counter 128A increases the first count value C1 even after the first weight coefficient K1 reaches a predetermined upper limit value to be described later. Accordingly, even if the decrement of the first count value C1 is initiated after the first weight coefficient K1 reaches the predetermined upper limit value, the first weight coefficient K1 is maintained to the upper limit value until the first count value C1 decreases to a value corresponding to the predetermined upper limit value of the first weight coefficient K1. It is therefore possible to improve a rollover prevention effect after the end of the abrupt steering maneuver.

The second counter 128B increases (increments) a second count value C2 within a range of an upper limit value C2max if the steering-back maneuver determination unit 126 determines that an abrupt steering-back maneuver is made, and decreases (decrements) the second count value C2 if the steering-back maneuver determination unit 126 determines that an abrupt steering maneuver is not made. Values of the increment and the decrement may be same or different. In this embodiment, in order to leave the influence of an abrupt steering-back maneuver for a relatively longer period of time if the driver executes the abrupt steering-back maneuver, the value of the decrement is set smaller than the value of the increment. The second counter 128B increases the second count value C2 even after the second weight coefficient K2 reaches a predetermined upper limit value to be described later. Accordingly, even if the decrement of the second count value C2 is initiated after the second weight coefficient K2 reaches the predetermined upper limit value, the second weight coefficient K2 is maintained to the upper limit value until the second count value C2 decreases to a value corresponding to the predetermined upper limit value of the second weight coefficient K2. It is therefore possible to improve a rollover prevention effect, particularly after the end of the steering-back maneuver.

The first weight coefficient setting unit 128C sets the first weight coefficient K1, which is equivalent to the weight of the yaw rate-based roll angle Ra2, in accordance with the first count value C1 and in a range equal to or smaller than the predetermined upper limit value. The first weight coefficient K1 set in this stage is also used as a weight coefficient for the yaw rate-based roll rate Ra2'. According to this embodiment, the first weight coefficient K1 is a value obtained by multiplying the first count value C1 by a fixed coefficient α1, and the predetermined upper limit value is 1.

The second weight coefficient setting unit 128D sets the second weight coefficient K2, which is equivalent to the weight of the steering angle-based roll angle Ra3, in accordance with the second count value C2 and in a range equal to or smaller than the predetermined upper limit value. According to this embodiment, the second weight coefficient K2 is a value obtained by multiplying the second count value C2 by a fixed coefficient α2, and the predetermined upper limit value is K2max which is a value smaller than 1.

The parameter calculation unit 128 calculates the first composition roll angle Ra12 and the second composition roll angle Ra by the following expressions, using the first weight coefficient K1 and the second weight coefficient K2 calculated by the various units 128A-128D as described above.

$Ra12 = K1 \times Ra2 + (1-K1) \times Ra1$ $Ra = K2 \times Ra3 + (1-K2) \times Ra12$ In order to set the roll angle threshold value Rath, as best seen in FIG. 4, the parameter calculation unit 128 includes a threshold calculation roll rate calculation unit 128E. The roll angle used for calculating the threshold calculation roll rate may be a roll angle equivalent to the actual roll angle or an estimated roll angle calculated from another parameter; the roll angle equivalent to the actual roll angle includes, for example, a roll angle obtained from the roll angle sensor, and a lateral acceleration-based roll angle. This roll angle may be the same as the rollover detection parameter or obtained separately. Further, unless the meaning of its physical quantity is lost, a filtering process may be applied to the roll angle. Alternatively, other calculation methods may be adopted such as by combining the roll angle with another value. In this embodiment, the lateral acceleration-based roll angle Ra1 and the yaw rate-based roll angle Ra2 calculated by the roll angle calculation unit 121 are used for calculating the threshold calculation roll rate.

The threshold calculation roll rate calculation unit 128E calculate a composition roll rate Ra12' used as the threshold calculation roll rate, by combining at a predetermined weight assignment ratio the lateral acceleration-based roll rate Ra1' which is a rate of change of the first roll angle (the lateral acceleration-based roll angle Ra1) equivalent to the actual roll angle with the yaw rate-based roll rate Ra2' which is a rate of change of the second roll angle (the yaw rate-based roll angle Ra2) obtained using a parameter which changes with a phase earlier than the first roll angle. The threshold calculation roll rate calculation unit 128E calculates the composition roll rate Ra12' by changing the weight assignment ratio such that a weight of the second roll rate is higher when the steering maneuver determination unit 125 determines that an abrupt steering maneuver is made than when the steering maneuver determination unit 125 determines that the abrupt steering maneuver is not made.

To be more specific, the threshold calculation roll rate calculation unit 128E calculates the composition roll rate Ra12' by the following expression, using the first weight coefficient K1 calculated by the first weight coefficient setting unit 128C.

$$Ra12' = K1 \times Ra2' + (1-K1) \times Ra1'$$

The threshold calculation roll rate calculation unit 128E sets the threshold calculation roll rate to zero if the instability level is smaller than a predetermined value Lv.

Figure 5:
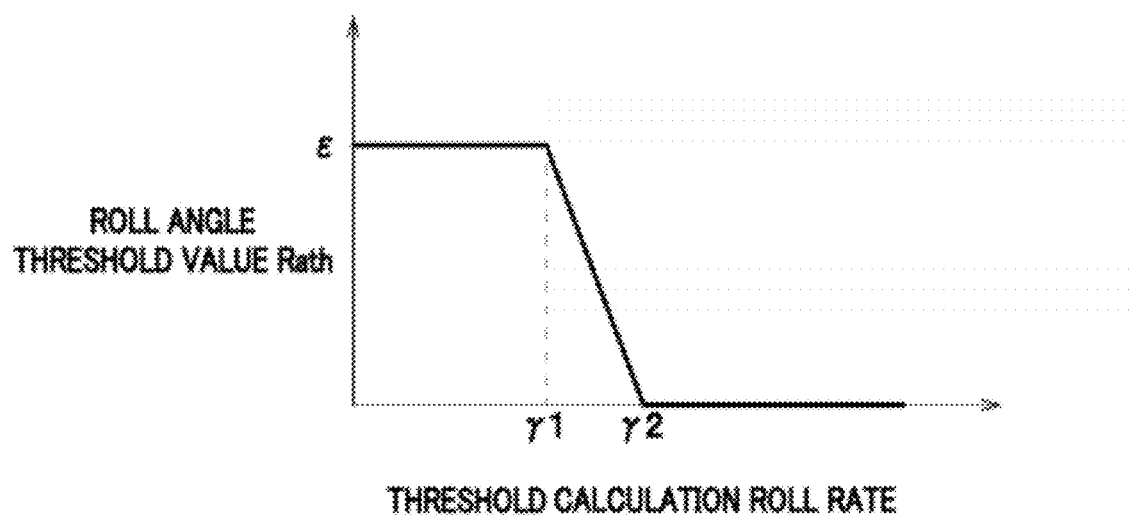
FIG. 5 is a graph showing the relationship between threshold calculation roll rate and roll angle threshold value.

The parameter calculation unit 128 sets the roll angle threshold value Rath, using a value of the threshold calculation roll rate set by the threshold calculation roll rate calculation unit 128E and referring to a conversion table between threshold calculation roll rate and roll angle threshold value Rath. The conversion table is stored in the storage unit 180. As best seen in FIG. 5, in this conversion table, the roll angle threshold value Rath becomes smaller with an increase in the threshold calculation roll rate. To be more specific, the roll angle threshold value Rath is a fixed value $\epsilon$ until the threshold calculation roll rate becomes $\gamma1$, the roll angle threshold value Rath decreases to 0 (zero) at a constant slope when the threshold calculation roll rate is in the range from $\gamma1$ to $\gamma2$, and the roll angle threshold value Rath is 0 when the threshold calculation roll rate is greater than $\gamma2$.

Since the threshold calculation roll rate takes a fixed value $\epsilon$ until the threshold calculation roll rate becomes $\gamma1$, it is possible to prevent unnecessary rollover prevention control, for example, when the driver steers the vehicle into a J-turn by his slow steeling maneuver. Further, since the roll angle threshold value Rath is 0 when the threshold calculation roll rate is greater than $\gamma2$, it is possible to reliably execute the rollover prevention control under the condition that the vehicle is liable to roll over.

Figure 4B:
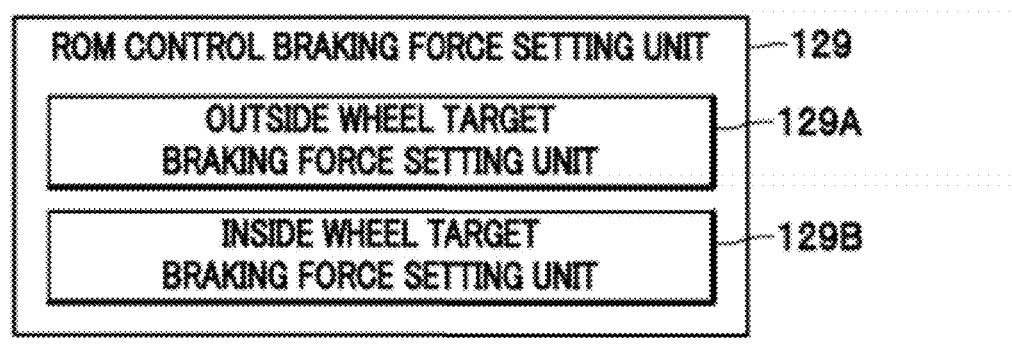
FIG. 4B is a block diagram illustrating the configuration of a ROM control braking force setting unit.

As seen in FIG. 4B, the ROM control braking force setting unit 129 includes an outside wheel target braking force setting unit 129A and an inside wheel target braking force setting unit 129B.

The outside wheel target braking force setting unit 129A sets an outside wheel target braking force as a target for braking the turning outside wheel with the first braking force; the outside wheel target braking force setting unit 129A sets the outside wheel target braking force based on a difference $\Delta Ra$ between the second composition roll angle Ra as the rollover detection parameter and the roll angle threshold value Rath. The rollover detection parameter is an index which shows a greater value if the possibility of the rollover of the vehicle is higher, and the roll angle threshold value Rath is a reference value for determining the possibility of the rollover. Accordingly, since the greater the difference $\Delta Ra$ between the rollover detection parameter and the predetermined threshold value (the roll angle threshold value Rath in this embodiment), the higher the possibility of the rollover of the vehicle is, setting the braking force applied to the turning outside wheel to a value corresponding to the difference $\Delta Ra$ makes is possible to apply an appropriate braking force to the outside wheel to prevent the rollover of the vehicle.

To be more specific, the difference $\Delta Ra$ is obtained as follows. First, a difference $\Delta Ra$ (left) during a left turn of the vehicle and a difference $\Delta Ra$ (right) during a right turn of the vehicle are calculated by the following expressions. Herein, the roll angle threshold value Rath is either 0 or a positive value.

$$\Delta Ra(\text{left}) = \text{MAX}\{(Ra-Rath), 0\}$$

$$\Delta Ra(\text{right}) = \text{MAX}\{((-Rath)-Ra), 0\}$$

Second, of these differences $\Delta Ra$ (left) and $\Delta Ra$ (right), the one with greater value is adopted as $\Delta Ra$.

Further, according to this embodiment, in order to set a more appropriate braking force by means of a PI control, the outside wheel target braking force setting unit 129A calculates a PI output value from the difference $\Delta Ra$. In order to adjust the magnitude of the value, the outside wheel target braking force setting unit 129A inputs a value obtained by multiplying the PI output value by a correction coefficient as an outside wheel target braking force Fout.

Further, the outside wheel target braking force setting unit 129A sets the outside wheel to target braking force Fout1 of the rear wheels such that the upper limit value of the outside wheel target braking force Fout1 is a predetermined value Foutmax (i.e., third predetermined value). As compared with the front wheels, the rear wheels are liable to slip during braking. For this reason, the upper limit value is provided for preventing an unstable posture of the vehicle CR due to slippage of the rear wheels.

The outside wheel target braking force is calculated based on the difference $\Delta Ra$. If the rollover tendency is not determined after determination of the rollover tendency, the outside wheel target braking force setting unit 129A substitutes 0 for the difference $\Delta Ra$.

The inside wheel target braking force setting unit 129E sets the inside wheel target braking force as a target for braking the turning inside wheel with the second braking force, using a value smaller than that of the outside wheel target braking force. In this embodiment, the inside wheel target braking force setting unit 129B basically sets a predetermined value as the inside wheel target braking force. To be more specific, the predetermined value is set as a first predetermined value B1 during a predetermined period of time Tm1 from initiating the rollover prevention control. After an elapse of the predetermined period of time Tm1, the predetermined value is set as a second predetermined value B2 which is smaller than the first predetermined value B1. Accordingly, a rise time of the braking force can be improved, with the result that the braking of the inside wheel acts effectively at an initial stage of the rollover prevention control to reduce the vehicle speed and therefore the vehicle can be stabilized because of the reduction rollover tendency.

Further, even if the outside wheel target braking force is set to a smaller value in accordance with a smaller rollover tendency, it is preferable that the inside wheel target braking force is smaller than the outside wheel target braking force. For this reason, if a predetermined value (the first predetermined value B1 or the second predetermined value B2) is smaller than a multiplication value obtained by multiplying the outside wheel target braking force by a coefficient β smaller than 1, the inside wheel target braking force setting unit 129B sets the predetermined value as the inside wheel target braking force. If the predetermined value is not smaller than the multiplication value, the inside wheel target braking force setting unit 129B sets the multiplication value as the inside wheel target braking force. Therefore, the inside wheel target braking force is always smaller than the multiplication value obtained by multiplying the outside wheel target braking force by the coefficient β which is smaller than 1. In other words, a rollover of the vehicle CR can be prevented because the braking force applied to the outside wheel becomes greater than that applied to the inside wheel. The specific process for setting the inside wheel target braking force will be described later with reference to the flow chart.

The ROM control braking force setting unit 129 determines that the vehicle CR is turning right or left based on the value of the second composition roll angle Ra, and sets the target braking force for each of the wheels. To be more specific, the ROM control braking force setting unit 129 sets the target braking force for each of the wheels, based on the target braking force Fout for the front-side outside wheel and the target braking force Fout1 for the rear-side outside wheel, which are calculated by the outside wheel target braking force setting unit 129A, and based on the target braking force Fin for the front-side inside wheel and the target braking force Fin1 for the rear-side inside wheel, which are calculated by the inside wheel target braking force setting unit 129B.

The rollover prevention control unit 120 always monitors the second composition roll angle Ra and executes the rollover prevention control by applying a braking force to at least one of the wheel brakes FL, RR, RL, FR at a timing when the difference ΔRa between the second composition roll angle Ra and the positive roll angle threshold value Rath is greater than the predetermined value ΔRath (ΔRath is either 0 or a positive value) or when the difference between the second composition roll angle Ra and a predetermined negative roll angle threshold value −Rath is smaller than a predetermined value −ΔRath. Although the predetermined value ΔRath used may include any arbitrary values such as 0, setting the predetermined value ΔRath to an appropriate value makes it possible to prevent the rollover prevention control from being performed more sensitive than necessary. In this instance, the braking forces are applied simultaneously to the right and left wheels W arranged on the same axle throughout the time that the rollover prevention control is performed. In other words, the application of the braking force to the right wheel is initiated at the same timing as the application of the braking force to the left wheel. According to this embodiment, since braking forces are applied to both front and rear wheels during the rollover prevention control, all of the four wheels are always braked during the rollover prevention control. In this embodiment, even after the rollover prevention control flag is changed from ON to OFF, the braking force is not immediately decreased to 0. In order to avoid abrupt change of the braking force at the outside wheel, the braking force is gradually decreased to 0.

The target braking forces for each of the wheels W, which are set as described above and used for the rollover prevention control, are output to the target braking force setting unit 130.

In the brake fluid pressure control apparatus according to this embodiment, the second composition roll angle Ra based on the lateral acceleration-based roll angle Ra1, the yaw rate-based roll angle Ra2 and the steering angle-based roll angle Ra3 is used as the rollover detection parameter. Namely, various units for calculating the second composition roll angle Ra constitute examples of a parameter acquisition unit configured to acquire the rollover detection parameter.

The target braking force setting unit 130 compares braking forces output from the behavior control unit 110 and to be applied to each of the wheels W with braking forces output from the rollover prevention control unit 120 and to be applied to each of the wheels W to determine greater braking forces, and then sets the greater braking forces as the target braking forces for each of the wheels W. The target braking force setting unit 130 outputs movements of the various valves and the motor 9 in the fluid pressure unit 10 to the valve drive unit 140 and the motor drive unit, respectively, in accordance with the target braking forces.

The valve drive unit 140 actually drives the control valve units V, the pressure regulating valves R, and the suction valves 7, in accordance with instructions from the target braking force setting unit 130.

The motor drive unit 150 drives the motor 9 to rotate in accordance with instructions from the target braking force setting unit 130. Description will be given of the process for executing the rollover prevention control by the controller 100 as described above.

Figure 7:
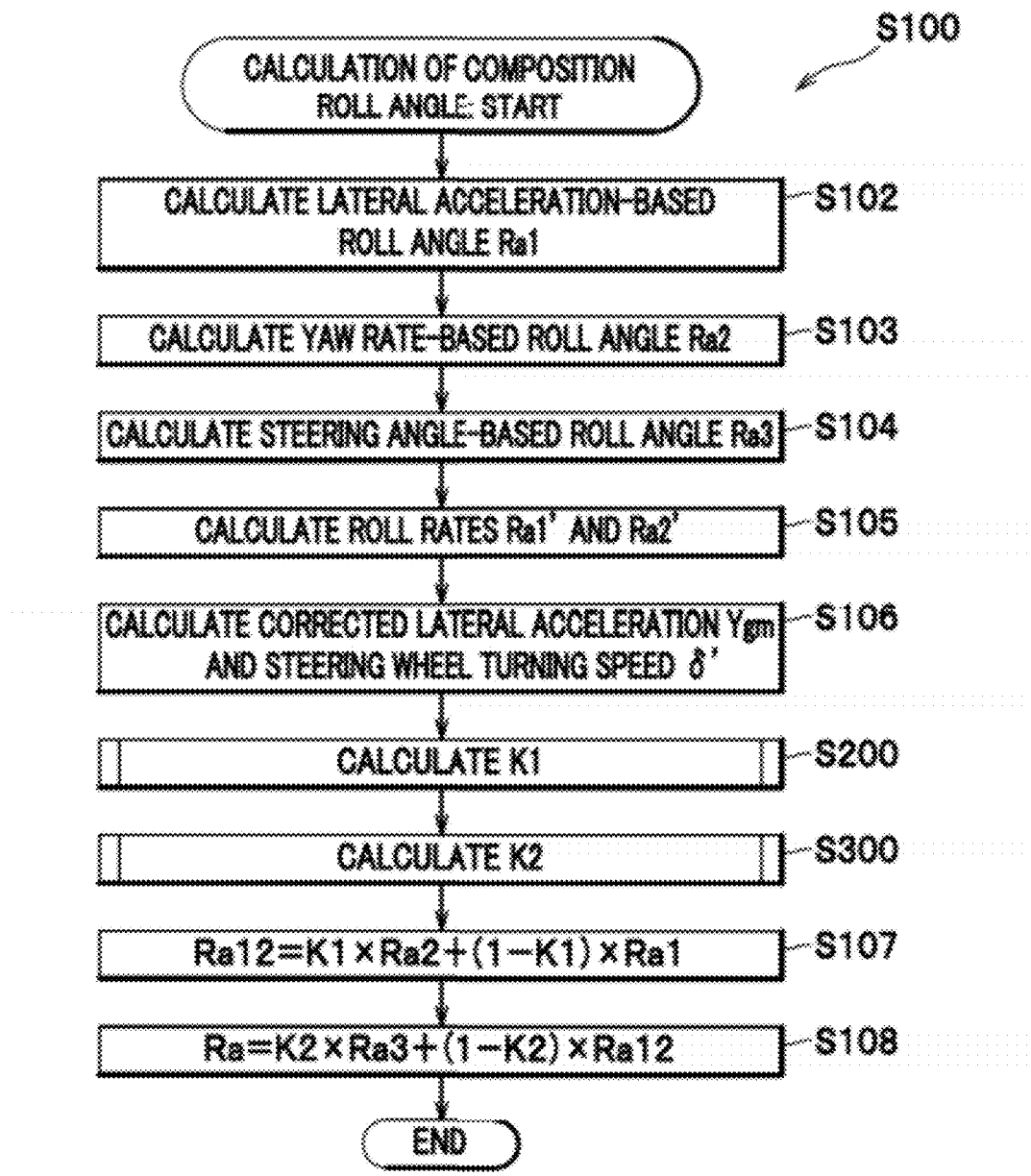
FIG. 7 is a flow chart explaining a process for calculating a composition roll angle.

As best seen in FIG. 7, the controller 100 reads detection signals from various sensors including the wheel speed sensors 91, the steering angle sensor 92, the lateral acceleration sensor 93, and the yaw rate sensor 94 (S1). The controller 100 then calculates the composition roll angle (S100).

The composition roll angle is calculated as shown in FIG. 7. The roll angle calculation unit 121 calculates the lateral acceleration-based roll angle Ra1, the yaw rate-based roll angle Ra2, and the steering angle-based roll angle Ra3, based on the detection values of the sensors 91-94 and the constants stored in the storage unit 180 (S102-S104).

The roll rate calculation unit 122 then calculates the lateral acceleration-based roll rate Ra1' by way of calculating a rate of change of the lateral acceleration-based roll angle Ra1, and calculates the yaw rate-based roll rate Ra2' by way of calculating a rate of change of the yaw rate-based roll angle Ra2 (S105). The corrected lateral acceleration calculation unit 123 calculates the corrected lateral acceleration Ygm from the lateral acceleration yg. Further, the steering wheel turning speed calculation unit 124 calculates a rate of change of the steering angle δ and applies a filtering process to calculate the steering wheel turning speed δ' (S106).

Figure 8:
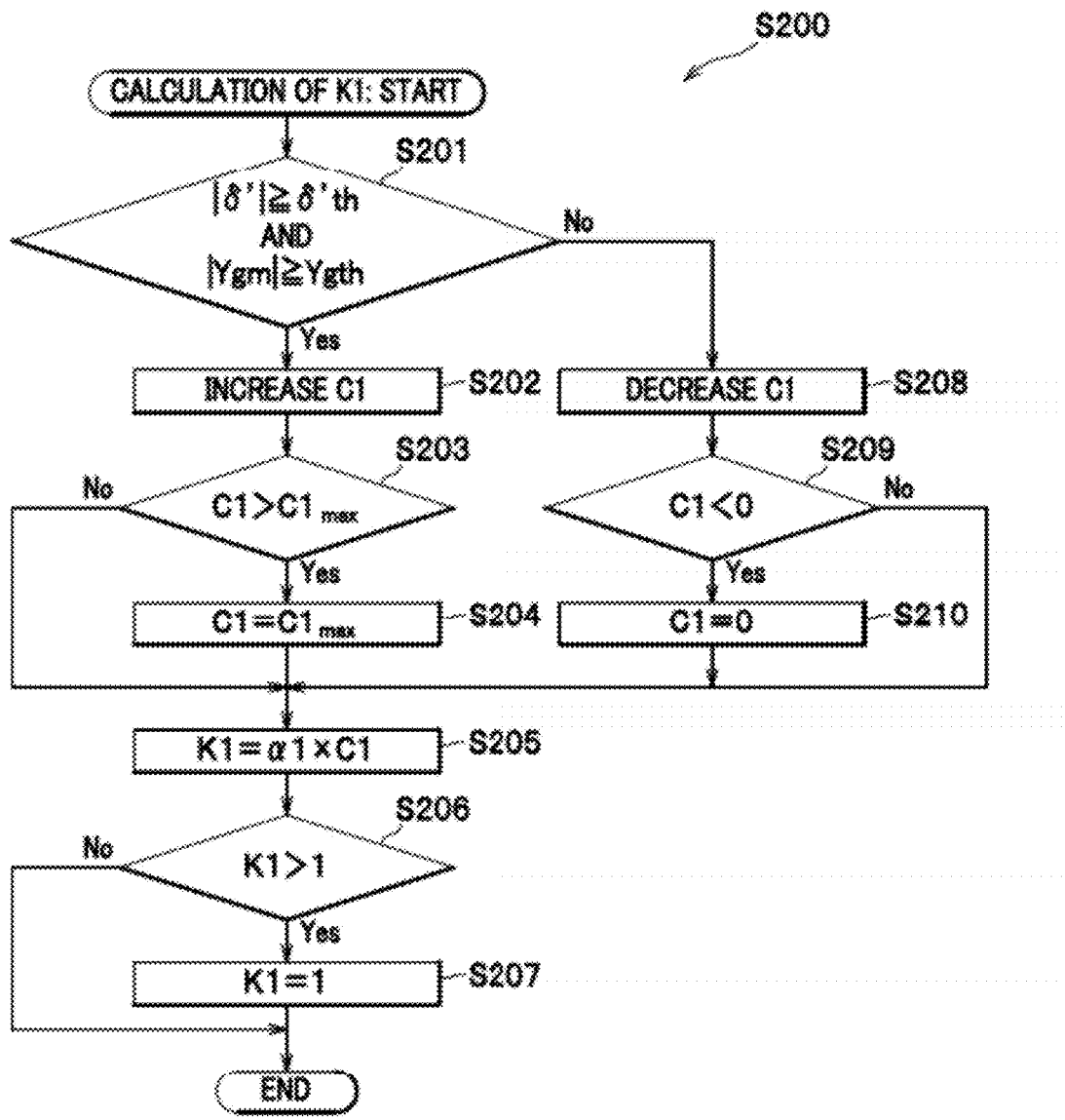
FIG. 8 is a flow chart explaining a process for calculating a first weight coefficient.

The first weight coefficient setting unit 128C in the rollover prevention control unit 120 calculates the first weight coefficient K1 (S200). The first weight coefficient K1 is calculated by the process shown in FIG. 8.

To be more specific, the steering maneuver determination unit 125 determines whether or not the absolute value of the steering wheel turning speed δ' is equal to or greater than the predetermined value δ'th and the absolute value of the corrected lateral acceleration Ygm is equal to or greater than the predetermined value Ygth (S201). Referring to FIG. 13, these conditions are satisfied in the time period from t11 to t13. If these conditions are satisfied, it is determined that an abrupt steering is made with a higher steering wheel turning speed δ' and a certain higher level of lateral acceleration Yg, which is likely to cause a rollover of the vehicle. For this reason, if the conditions in step S201 are satisfied (S201; Yes), the first counter 128A increases (increments) the first count value C1 (S202). Further, if the first count value C1 is greater than the upper limit value C1max (S203; Yes), the first counter 128A sets the first count value C1 to the upper limit value C1max (S204). If the first count value C1 is not greater than the upper limit value C1max (S203; No), the first counter 128A sets the increased value as the first count value C1.

On the contrary, if these conditions are not satisfied in step S201 (S201; No), that is, when an abrupt steeling maneuver is not made, the first counter 128A decreases (decrements) the first count value C1 (S208, see also time period from t13 to t15 of FIG. 13): If the first count value C1 is smaller than 0 (S209; Yes), the first count value C1 is set to 0 (S210). If the first count value C1 is not smaller than 0 (S209; No), the value is set as the first count value C1.

When the first count value C1 is determined by the above steps, the first count value C1 is multiplied by a coefficient α1 to obtain the first weight coefficient K1 (S205). If the first weight coefficient K1 is greater than 1 (S206; Yes), the first weight coefficient K1 is set to the upper limit value, that is 1 in this embodiment (S207). If the first weight coefficient K1 is not greater than 1 (S206; No), the value is set as the first weight coefficient K1.

Next, the second weight coefficient setting unit 128D in the rollover prevention control unit 120 calculates the second weight coefficient K2 (S300). The second weight coefficient K2 is calculated by the process shown in FIG. 9.

To be more specific, the steering-back maneuver determination unit 126 determines in step S301 whether or not the multiplication value δ×Yg is negative, that is, whether or not the signs indicating fight and left of the steering angle δ and the lateral acceleration Yg are different from each other (i.e., whether or not the countersteering is detected; see also time period from t21 to t26 of FIG. 14). If the multiplication value δ×Yg is negative (S301; Yes), the steering-back maneuver determination unit 126 determines in step S302: whether or not the multiplication value Ra1×Ra1' is negative, that is, whether or not the signs indicating right and left of the lateral acceleration-based roll angle Ra1 and the lateral acceleration-based roll rate Ra1' are different from each other; and whether or not the absolute value of the lateral acceleration-based roll rate Ra1' is equal to or greater than the predetermined value Ra1'th (i.e., whether or not an abrupt steering-back maneuver is made). If these conditions in step S302 are satisfied (S302; Yes), the steering-back maneuver determination unit 126 further determines in step S303: whether or not the multiplication value Ra2×Ra2' is negative, that is, whether or not the signs indicating right and left of the yaw rate-based roll angle Ra2 and the yaw rate-based roll rate Ra2' are different from each other; and whether or not the absolute value of the yaw rate-based roll rate Ra2' is equal to or greater than the predetermined value Ra2'th (i.e., whether or not an abrupt steering-back maneuver is made). If these conditions in step S303 are satisfied, the steering-back maneuver determination unit 126 determines that an abrupt steering-back maneuver is made. Referring to FIG. 14, the conditions in step S301-S303 are satisfied in the time period from t22 to t24. If these conditions are satisfied, it is determined that an abrupt steering-back maneuver is made, which is likely to cause a rollover of the vehicle. For this reason, the second counter 128B increases the second count value C2 (S304). Further, if the second count value C2 is greater than the upper limit value C2max (S305; Yes), the second counter 128B sets the second count value C2 to the upper limit value C2max (S306). If the second count value C2 is not greater than the upper limit value C2max (S305; No), the second counter 128B sets the increased value as the second count value C2.

On the contrary, if any of the conditions is not satisfied in steps S301-S303 (S30'-S303; No), that is, when an abrupt steering-back maneuver is not made, the second counter 128B decreases the second count value C2 (S311, see also time period from t24 to t26 of FIG. 14). If the second count value C2 is smaller than 0 (S312; Yes), the second count value C2 is set to 0 (S313), so that the second count value C2 takes a value not smaller than 0. If the second count value C2 is not smaller than 0 (S312; No), the value is set as the second count value C2.

When the second count value C2 is determined by the above steps, the second count value C2 is multiplied by a coefficient α2 to obtain the second weight coefficient K2 (S307). If the second weight coefficient K2 is greater than K2max that is a value smaller than 1 (S308; Yes), the second weight coefficient K2 is set to the upper limit value, that is K2max in this embodiment (S309). If the second weight coefficient K2 is not greater than K2max (S308; No), the value is set as the second weight coefficient K2.

Returning now to FIG. 7, after the first weight coefficient K1 and the second weight coefficient K2 are obtained, the parameter calculation unit 128 calculates the first composition roll angle Ra12 by the following expression (S107), by combining the lateral acceleration-based roll angle Ra1 and the yaw rate-based roll angle Ra2 using the first weight coefficient K1.

$$Ra12=K1 \times Ra2+(1-K1) \times Ra1$$

As seen in FIG. 13, the first composition roll angle Ra12 is based on the lateral acceleration-based roll angle Ra1; however, if the first weight coefficient K1 is greater than 0 (e.g., time period from t11 to t15), the first composition roll angle Ra12 reflects the yaw rate-based roll angle Ra2 which changes with a phase earlier than the lateral acceleration-based roll angle Ra1, and in the time period from t12 to t14, the first composition roll angle Ra12 completely follows the yaw rate-based roll angle Ra2.

Thereafter, the parameter calculation unit 128 calculates the second composition roll angle Ra by the following expression (S108), by combining the first composition roll angle Ra12 and the steering angle-based roll angle Ra3 using the second weight coefficient K2.

$$Ra=K2 \times Ra3+(1-K2) \times Ra12$$

As seen in FIG. 14, the second composition roll angle Ra is based on the first composition roll angle Ra12; however, if the second weight coefficient K2 is greater than 0 (e.g., time period from t22 to t26), the second composition roll angle Ra is obtained by combining the steering angle-based roll angle Ra3 which changes with a phase earlier than the lateral acceleration-based roll angle Ra1 and the yaw rate-based roll angle Ra2 with the first composition roll angle Ra12, and in the time period from t23 to t25, the second composition roll angle Ra approaches the steering angle-based roll angle Ra3.

Returning to FIG. 6, the parameter calculation unit 128 sets the roll angle threshold value Rath in step S400. To be more specific, as seen in FIG. 10, the threshold calculation roll rate calculation unit 128E calculates the composition roll rate Ra12' by the following expression (S401), by combining the lateral acceleration-based roll rate Ra1' and the yaw rate-based roll rata Ra2' using the first weight coefficient K1.

$$Ra12'=K1\times Ra2'+(1-K1)\times Ra1'$$

As seen in FIG. 15, the composition roll rate Ra12' is based on the lateral acceleration-based roll rate Ra1'; however, if the first weight coefficient K1 is greater than 0 (e.g., time period from t11 to t15), the composition roll rate Ra12' reflects the yaw rate-based roll rate Ra2' obtained from the yaw rate-based roll angle Ra2 which changes with a phase earlier than the lateral acceleration-based roll angle Ra1, and in the time period from t12 to t14, the composition roll rate Ra12' completely follows the yaw rate-based roll rate Ra2'.

The threshold calculation roll rate calculation unit 128E then calculates the threshold calculation roll rate (S402) by taking the absolute value of the composition roll rate Ra12' as shown in FIG. 16 and filtering the obtained value such that the absolute value of the composition roll rate Ra12' decreases less.

Further, the threshold calculation roll rate calculation unit 128E determines whether or not the instability level calculated by the instability level calculation unit 127 is equal to or greater than the predetermined level Lv. If the instability level is smaller than the predetermined level Lv (S403; No), the threshold calculation roll rate is set to 0 (S404). If the instability level is not smaller than the predetermined level Lv (S403; Yes), the threshold calculation roll rate is not changed.

Next, the parameter calculation unit 128 refers to a conversion table of FIG. 5 for converting between threshold calculation roll rate and roll angle threshold value Rath, and sets the roll angle threshold value Rath from the threshold calculation roll rate (S405). Accordingly, as best seen in FIG. 16, when the threshold calculation roll rate increases abruptly at the time t31 and in the time period from t32 to t33, the roll angle threshold value Rath decreases abruptly, and when the threshold calculation roll rate is equal to or greater than γ2 (time period from t33 to t34), the roll angle threshold value is 0.

Figure 6:
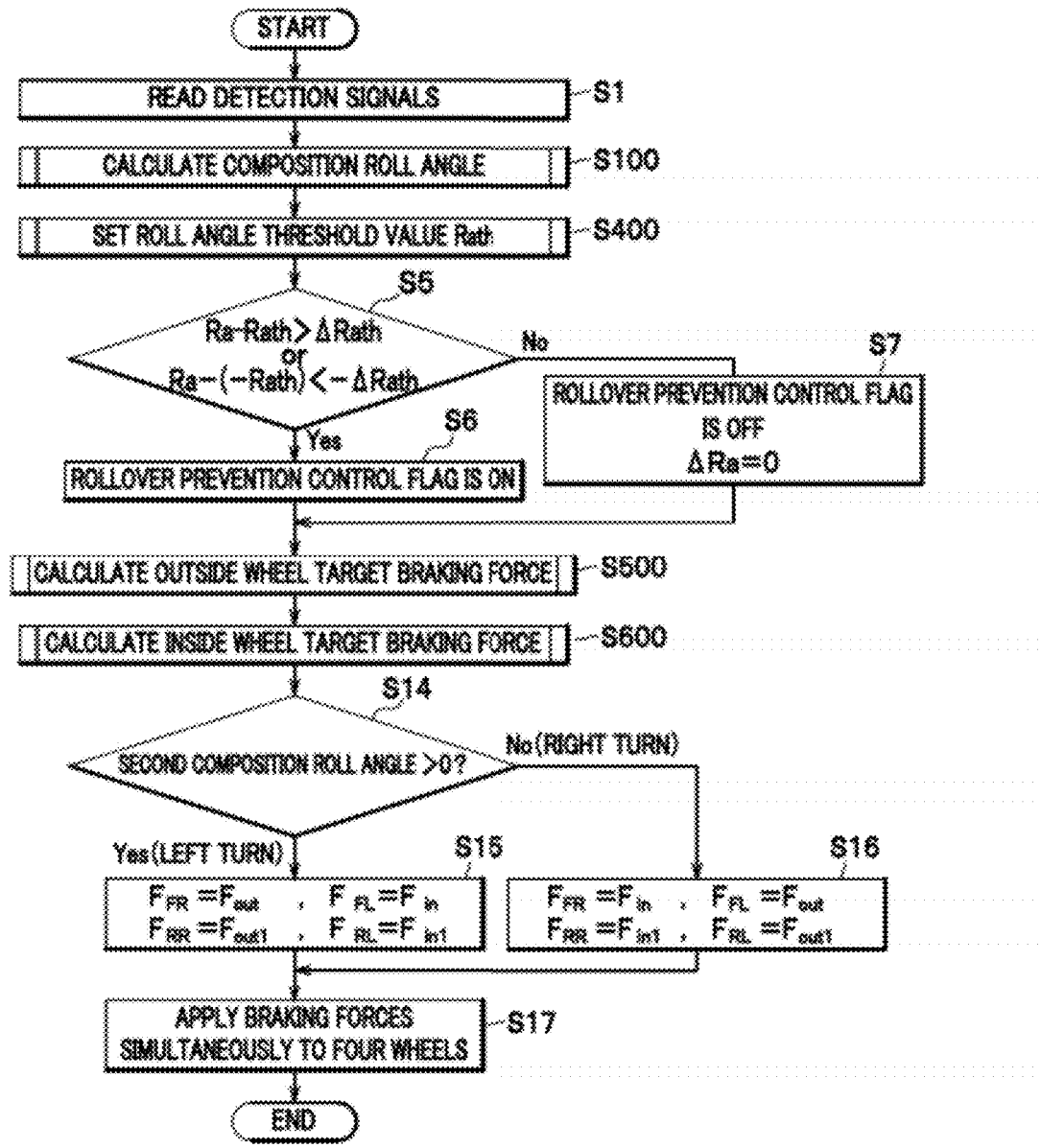
FIG. 6 is a flow chart explaining an overall process of a rollover prevention control.
Figure 17:
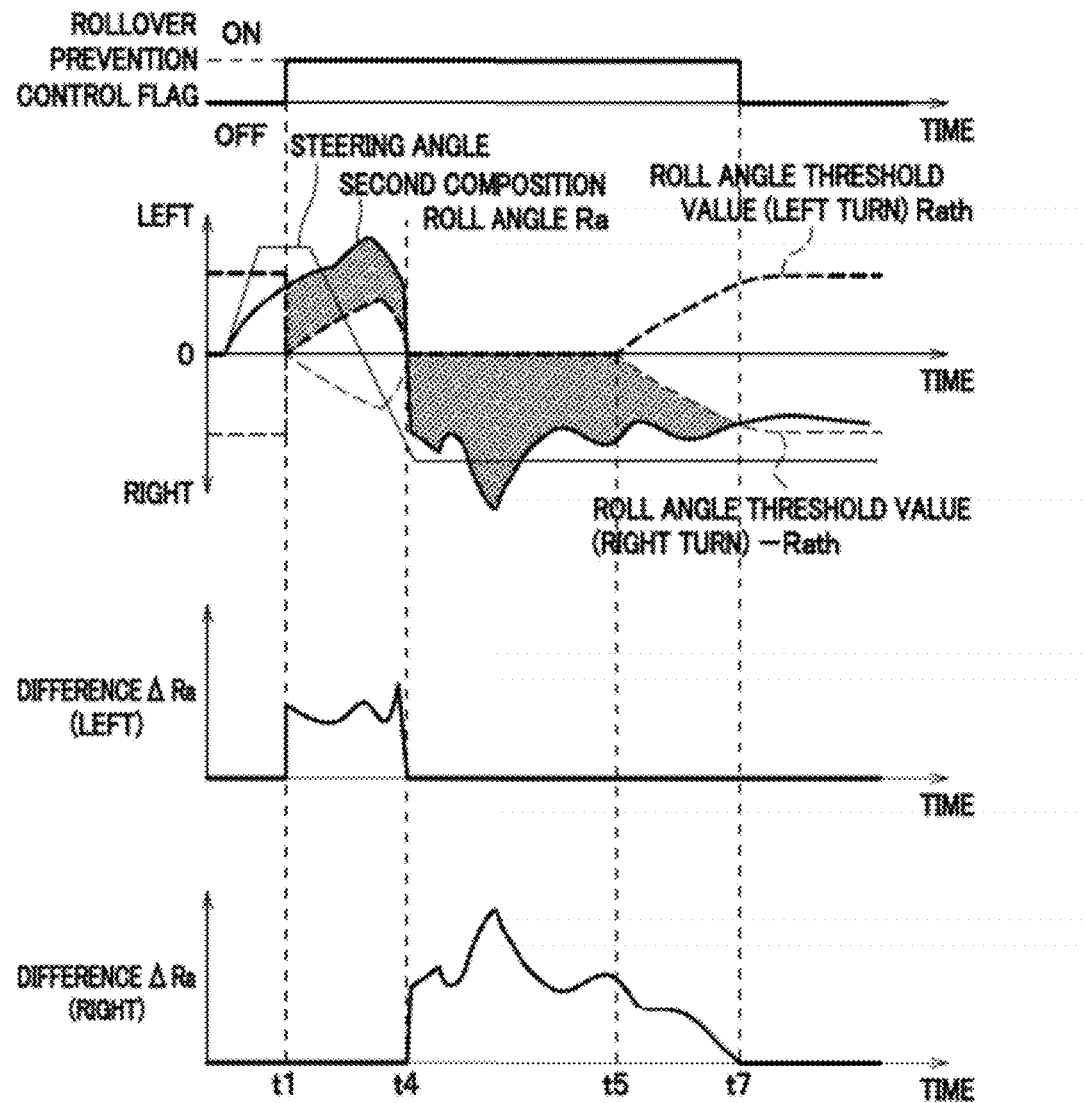
FIG. 17 shows graphs explaining the calculation of a difference $\Delta Ra$.

When the second composition roll angle Ra as the rollover detection parameter and the roll angle threshold value Rath are obtained as described above, the rollover prevention control unit 120 compares the second composition roll angle Ra with the roll angle threshold values Rath, −Rath, as shown in FIG. 6. If the difference between the second composition roll angle Ra and the positive roll angle threshold value Rath is greater than the predetermined value ΔRath or if the difference between the second composition roll angle Ra and the negative roll angle threshold value −Rath is smaller than the predetermined value −ΔRath (S5; Yes, see also time period from t1 to t7 of FIG. 17), then the rollover prevention control flag is turned ON (S6). On the contrary, if the difference between the second composition roll angle Ra and the positive roll angle threshold value Rath is not greater than the predetermined value ΔRath and if the difference between the second composition roll angle Ra and the negative roll angle threshold value −Rath is not smaller than the predetermined value −ΔRath (S5; No, see also time period before t1 and time period after t7 of FIG. 17), then the rollover prevention control flag is turned OFF. In order not to affect the setting of the outside wheel target braking force to be described later, the difference ΔRa is set to 0 (S7). The condition for determining optimum start timing for the rollover prevention control may include, for example, whether the vehicle speed Vx is equal to or greater than a predetermined value, and whether the corrected lateral acceleration Ygm is equal to or greater than a predetermined value.

Figure 18A:
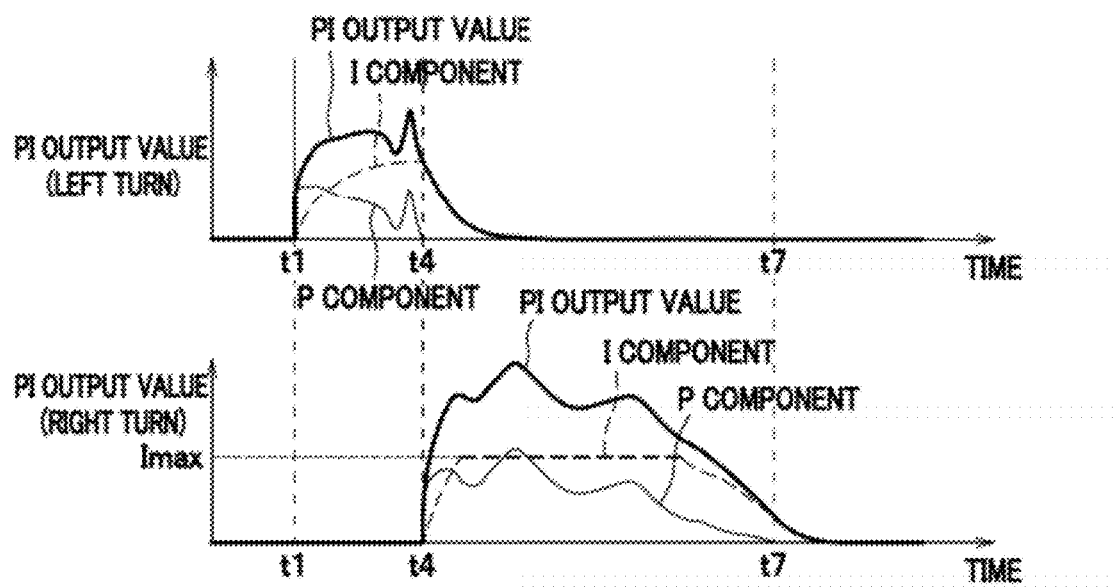
FIG. 18A shows graphs explaining the calculation of a PI output value from the difference $\Delta Ra$.
Figure 18B:
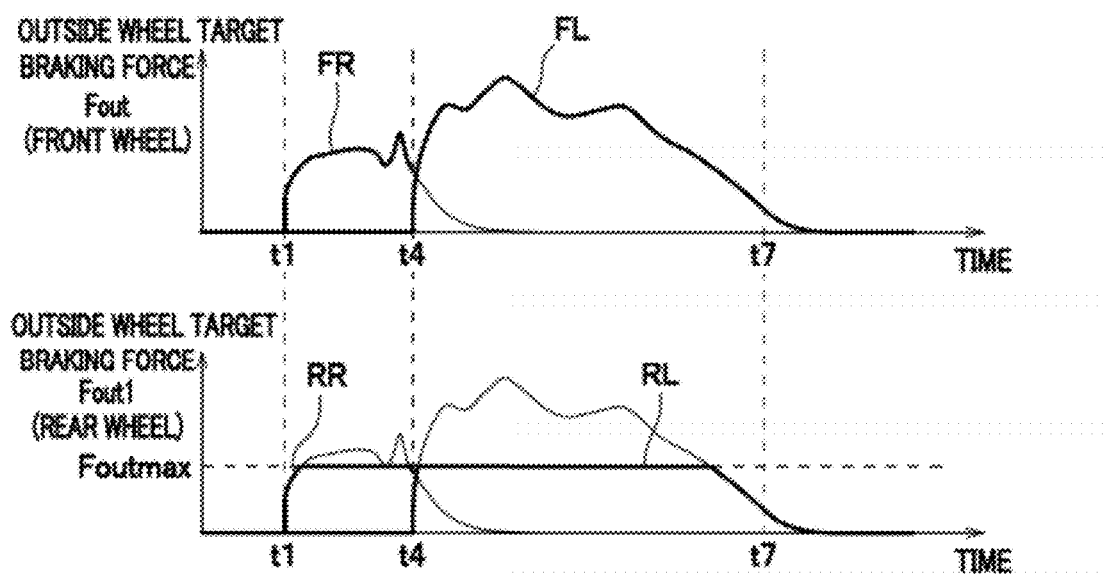
FIG. 18B shows time charts of outside wheel target braking forces for front wheels and rear wheels, respectively.
Figure 20A:
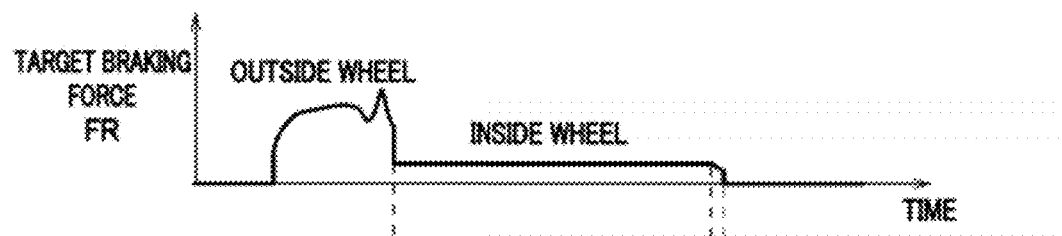
FIG. 20 shows time charts of the target braking forces for the front right wheel (a), the front left wheel (b), the rear right wheel (c), and the rear left wheel (d), respectively.
Figure 20B:
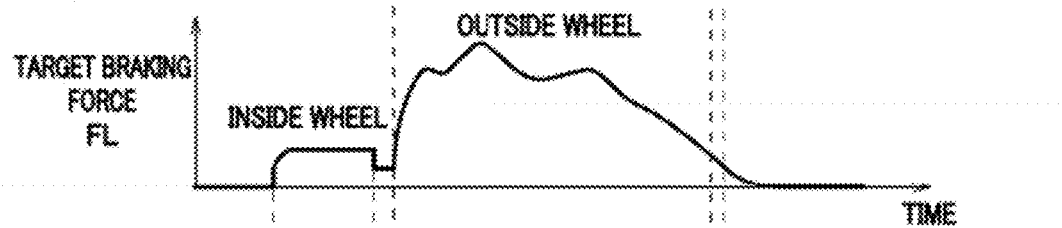
Figure 20C:
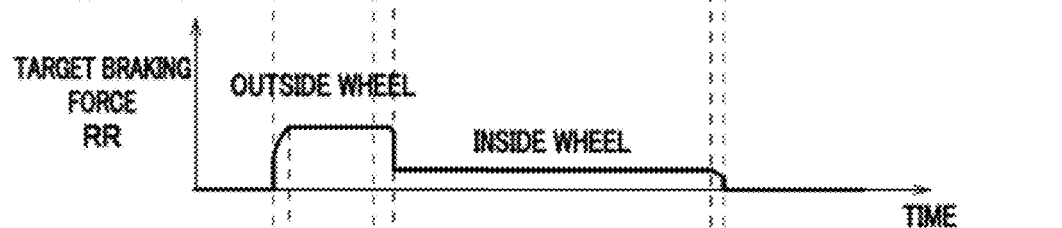
Figure 20D:
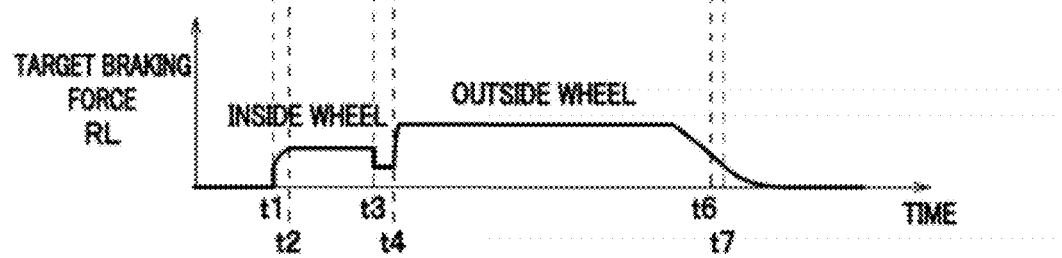

The outside wheel target braking force setting unit 129A sets the outside wheel target braking force for the rollover prevention control (S500). To be more specific, as seen in FIGS. 11 and 18A, the P component (proportional component) and I component (integral component) are calculated from the difference ΔRa, and the PI output value is obtained by adding these components (S501). As seen in FIG. 18A, the upper limit value Imax is set for the I component. The outside wheel target braking force setting unit 129A then calculates Fout by multiplying the PI output value by the predetermined correction coefficient (S502). For the purpose of better comprehension from FIGS. 18A and 18B, the correction coefficient is smaller than 1.

Further, the outside wheel target braking force setting unit 129A calculates Fout1 as the braking force for the rear wheels; Fout1 is limited (limit controlled) to Foutmax (S503).

The inside wheel target braking force setting unit 129B sets the inside wheel target braking force for performing the rollover prevention control (S600). To be more specific, as seen in FIG. 12, a determination is made in step S601 as to whether the rollover prevention control has just been initiated and the pressure in the wheel cylinder is equal to or lower than a predetermined value (S601). The initiation of the rollover prevention control can be determined from the former value and the present value on the rollover prevention control flag; if the former value is OFF and the present value is ON, it can be said that the rollover prevention control has just been initiated. The condition as to whether or not the pressure in the wheel cylinder is equal to or lower than the predetermined value is optional; however, if the pressure in the wheel cylinder is not smaller than the predetermined value, it is not necessary to consider the use time of the braking force applied to the inside wheel and hence in this embodiment this condition is included in step S601. If the conditions in step S601 are Satisfied (S601; Yes), a value Tm1 is assigned to a timer Tm to start the timer Tm (S602). If these conditions in step S601 are not satisfied (S601; No), a determination is made as to whether or not the rollover prevention control has been finished or the turning direction of the vehicle CR has been changed to the opposite direction (S603). If one of the conditions in step S603 is satisfied (S603; Yes), it can be said that the rollover prevention control has been finished or the inside wheels and the outside wheels have been changed to each other after the driver's steering-back maneuver, and hence a value 0 is assigned to the timer Tm to reset the timer Tm (S604). If one of the conditions in step S603 is not satisfied (S603; No), the timer Tm starts counting down (S605). In order to avoid the timer Tm having a negative value after the steps S602, S604, and S605, the values Tm and 0, whichever is greater, is assigned to the timer Tm (S606).

Next, the inside wheel target braking force setting unit 129B sets the inside wheel target braking force in accordance with the value of the timer Tm (see also FIG. 19 for setting the inside wheel target braking force).

First, a determination is made as to whether or not the rollover prevention control flag is ON (S607). If the rollover prevention control flag is not ON (S607; No), then the inside wheel target braking forces for the front wheels (Fin) and for the rear wheels (Fin1) are set to 0 (S608). If the rollover prevention control flag is ON (S607; Yes), a determination is made as to whether or not the value of the timer Tm is greater than 0 (S609). If the value of the timer Tm is greater than 0 (S609; Yes), the inside wheel target braking forces for the front wheels (Fin) and the rear wheels (Fin1) are set to the first predetermined value B1 (S610) because the rollover prevention control is at an initial stage. On the contrary, if the value of the timer Tm is not greater than 0 (S609; No), the inside wheel target braking forces for the front wheels (Fin) and the rear wheels (Fin1) are set to the second predetermined value B2 (S611) because the rollover prevention control is not at the initial stage.

Further, the inside wheel target braking force setting unit 129B compares a multiplication value obtained by multiplying the outside wheel target braking force Fout for the front wheels by the coefficient β with the previously obtained inside wheel target braking force Fin for the front wheels, and the smaller one is newly set as the inside wheel target braking force Fin (S612). Therefore, if the inside wheel target braking force Fin (the first predetermined value B1 or the second predetermined value B2) is smaller than the multiplication value obtained by multiplying the outside wheel target braking force by the coefficient β, the first predetermined value B1 or the second predetermined value B2 are set as the inside wheel target braking force Fin. If the inside wheel target braking force Fin (the first predetermined value B1 or the second predetermined value B2) is not smaller than the multiplication value, the value obtained by multiplying the outside wheel target braking force by the coefficient β is set as the inside wheel target braking force Fin.

Similarly, a multiplication value obtained by multiplying the outside wheel target braking force Fout1 for the rear wheels by the coefficient β is compared with the inside wheel target braking force Fin1 for the rear wheels, and the smaller one is newly set as the inside wheel target braking force Fin1 (S612).

As described above, the target braking force Fout for the front-side outside wheel, the target braking force Fout1 for the rear-side outside wheel, the target braking force Fin for the front-side inside wheel, and the target braking force Full for the rear-side inside wheel are obtained. Thereafter, according to the steps S14-S17 in FIG. 6, the target braking forces for the respective wheels are set based on whether the vehicle CR hum right or left.

To be more specific, the ROM control braking force setting unit 129 determines whether or not the second composition roll angle Ra is greater than 0 (S14). If the second composition roll angle Ra is greater than 0, it is determined that the vehicle CR is turning left (S14; Yes), and the ROM control braking force setting unit 129 sets the target braking force $F_{FR}$ for the front-side right wheel (the outside wheel) to Fout, the target braking force $F_{RR}$ for the rear-side right wheel to Fout1, the target braking force $F_{FL}$ for the front-side left wheel (the inside wheel) to Fin, and the target braking force $F_{RL}$ for the rear-side left wheel to Fin1 (S15). On the contrary, if the second composition roll angle Ra is not greater than 0, it is determined that the vehicle CR is turning right (S14; No), and the ROM control braking force setting unit 129 sets the target braking force $F_{FR}$ for the front-side right wheel (the inside wheel) to Fin, the target braking force $F_{RR}$ for the rear-side right wheel to Fin1, the target braking force $F_{FL}$ for the front-side left wheel (the outside wheel) to Fout, and the target braking force $F_{RL}$ for the rear-side left wheel to Fout1 (S16).

The target braking forces set for the wheels as described above and used for the rollover prevention control are shown in FIGS. 20A-20D.

When the target braking forces for the wheels are set by the above steps, the rollover prevention control unit 120 outputs the target braking forces for the respective wheels to the target braking force setting unit 130. The target braking force setting unit 130 then compares the target braking forces output from the behavior control unit 110 and the target braking forces output from the rollover prevention control unit 120, and sets the greater ones as the target braking forces. The target braking force setting unit 130 outputs instructions to the valve drive unit 140 and the motor drive unit 150 such that the thus obtained target braking forces are applied to the respective wheels. Accordingly, braking forces are applied at the same time to all the four wheels (S17).

As described above, according to the brake fluid pressure control apparatus A for a vehicle in this embodiment, if a rollover tendency of the vehicle is detected, braking forces are applied to the four wheels respectively at the same timing with the brake applications being initiated at the same starting point. Further, irrespective of whether or not the driver is likely to make a steering-back maneuver, braking forces are always applied to the four wheels at the same timing. Namely, since braking force applications for the rollover prevention control are initiated at the same timing for the right and left wheels arranged on the same axle, the vehicle speed can be effectively reduced by making use of the braking forces applied to the inside wheels. This can also contribute to suppress the rollover tendency of the vehicle. If the driver makes a steering-back maneuver, since preparatory brake is applied from the beginning of the rollover prevention control for the wheels which are on the inside before the steering-back maneuver, sufficiently large braking forces can be applied promptly to the wheels which are on the outside after the steering-back maneuver (i.e., wheels which are on the inside before the steering-back maneuver). Therefore, if the driver makes a steering-back maneuver, the brake fluid pressures in the outside wheels are increased promptly to effectively prevent a rollover of the vehicle.

According to the brake fluid pressure control apparatus A, since the outside wheel target braking force is set based on the difference ΔRa between the roll angle (the second composition roll angle Ra) indicating the rollover tendency and the roll angle threshold value Rath, it is possible to perform the control in accordance with the magnitude of the rollover tendency.

Since braking forces are applied to both front and rear wheels W, the vehicle speed of the vehicle CR can be effectively reduced to suppress the rollover tendency. Further, since the outside wheel target braking force for the rear wheels is limited to the predetermined value Foutmax, it is possible to suppress the unstable driving condition of the vehicle CR due to slippage of the rear wheels.

According to the brake fluid pressure control apparatus A, since the inside wheel target braking force is set to a greater value at an initial stage of the rollover prevention control to promptly reduce the vehicle speed, the vehicle CR can be stabilized.

Further, according to the brake fluid pressure control apparatus A in this embodiment, if the driver makes an abrupt steering maneuver, the second composition roll angle Ra (the first composition roll angle Ra12) is calculated using the yaw rate-based roll angle Ra2 which changes with a phase earlier than the lateral acceleration-based roll angle Ra1 equivalent to the actual roll angle, and the obtained second composition roll angle Ra is set as the rollover detection parameter. Therefore, if there is a high possibility of rollover of the vehicle, such a high possibility can be detected earlier and the rollover prevention control can be initiated at an earlier timing. If the driver makes an abrupt steering-back maneuver, the second composition roll angle Ra is calculated using the steering angle-based roll angle Ra3 which changes with a phase earlier than the lateral acceleration-based roll angle Ra1 and the yaw rate-based roll angle Ra2, and the obtained second composition roll angle Ra is set as the rollover detection parameter. Therefore, if there is a higher possibility of rollover of the vehicle, such a higher possibility can be detected earlier and the rollover prevention control can be initiated promptly to improve the rollover prevention effect.

Figure 21:
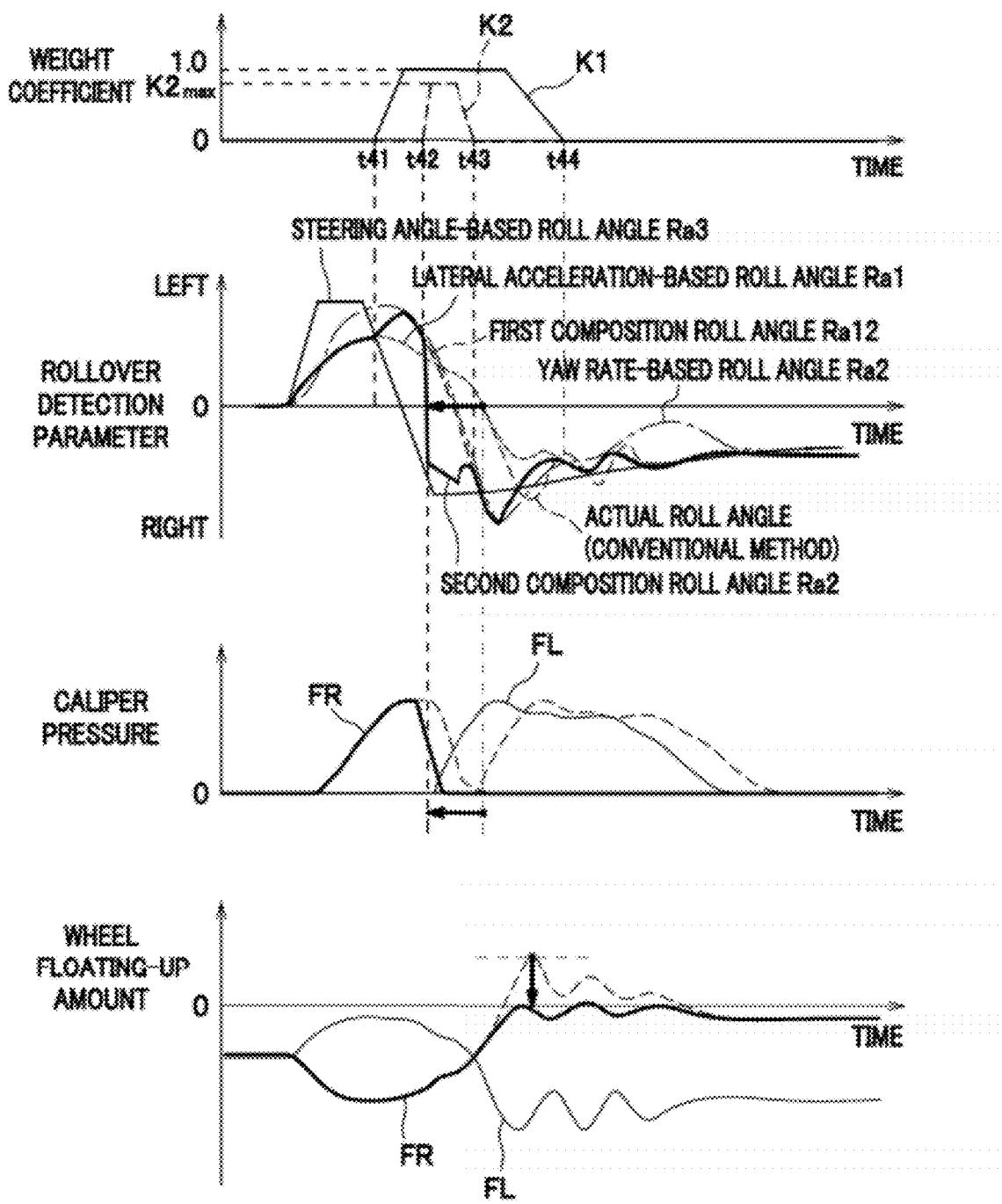
FIG. 21 shows time charts of a weight coefficient, a rollover detection parameter, a caliper pressure, and a wheel lifting amount, as exhibited when the rollover prevention control is carried out by the brake fluid pressure control apparatus according to one embodiment of the present invention.

The above advantageous effects will be described with reference to FIG. 21. As seen in the figure, when the first weight coefficient K1 and the second weight coefficient K2 are not 0 (i.e., time period from t41 to t44, particularly at time period from t42 to t43), the second composition roll angle changes with a phase earlier than the lateral acceleration-based roll angle and the first composition roll angle as seen in the graph showing the rollover detection parameter. Accordingly, the rollover prevention control can be executed promptly and the caliper pressure in the wheel brake FL increases quickly (in the graph, the solid line indicates the embodiment according to the present invention, and dashed line indicates a comparative embodiment). Therefore, as seen in the graph showing wheel lifting amount, the rollover prevention control according to the embodiment can reduce the wheel lifting amount of the vehicle as compared with the control made by the comparative embodiment.

Further, according to the brake fluid pressure control apparatus A in this embodiment, the parameter calculation unit 128 sets the roll angle threshold value Rath to a smaller value with an increase in the threshold calculation roll rate. Therefore, in the case where the threshold calculation roll rate is greater, the roll angle threshold value Rath is smaller accordingly, so that the lateral acceleration-based roll angle Ra1 as the rollover detection parameter is apt to be greater than the roll angle threshold value Rath. As a result, the rollover prevention control can be initiated promptly under such a condition that the vehicle is apt to roll over due to rapidly increased roll angle. This can improve the stability while driving the vehicle According to the brake fluid pressure control apparatus A in this embodiment, the threshold calculation roll rate is set to zero if the instability level is smaller than the predetermined value Lv, with the result that the roll angle threshold value Rath increases to prevent unnecessary rollover prevention control.

Further, according to the brake fluid pressure control apparatus A in this embodiment, if the driver makes an abrupt steering maneuver, the composition roll rate Ra12' is calculated using the yaw rate-based roll rate Ra2' which is a rate of change of the yaw rate-based roll angle Ra2; the yaw rate-based roll angle Ra2 changes with a phase earlier than the lateral acceleration-based roll angle Ra1 equivalent to the actual roll angle. And based on the thus obtained composition roll rate Ra12', the threshold calculation roll rate and the roll angle threshold value Rath are calculated. Therefore, if there is a high possibility of rollover of the vehicle, such a high possibility can be detected earlier and the rollover prevention control can be initiated at an earlier timing.

Although the present invention has been described in detail with reference to an exemplary embodiment, the present invention is not limited to this specific embodiment. It is to be understood that modifications and changes may be made to any of the specific configurations without departing from the scope of the appended claims.

For example, in the above embodiment, the lateral acceleration-based roll angle Ra1 is exemplified as the first roll angle and the yaw rate-based roll angle roll angle Ra2 is exemplified as the second roll angle. However, the lateral acceleration-based roll angle Ra1 as the first roll angle and the steeling angle-based roll angle Ra1 as the second roll angle may be combined using the first weight coefficient K1 to obtain the rollover detection parameter.

In the above embodiment, for the purpose of accurate determination of the steering-back maneuver, the steering-back determination unit 126 determines for both of the lateral acceleration-based roll angle Ra1 and the yaw rate-based roll angle Ra2 whether or not the signs indicating right and left of the roll angle and the roll rate are different from each other, and whether or not the absolute value of the roll rate is equal to or greater than the predetermined value. However, the steering-back determination unit 126 may determine the abrupt steering-back maneuver based on either one of the first roll angle and the second roll angle. To be more specific, the steering-back determination unit 126 may determine that the driver makes an abrupt steering-back maneuver: (a) if at least one of the first roll angle and the second roll angle has a different sign with respect to the signs indicating right and left of the roll angle and the roll rate; and (b) if the absolute value of the roll rate that satisfies the above condition (a) is equal to or greater than a predetermined value.

In the above embodiment, for the purpose of executing the rollover prevention control at an earlier timing, the second composition roll angle Ra is used as the rollover detection parameter. However, the present invention is not limited to this specific embodiment, and the first composition roll angle Ra12 as described above, the roll angle obtained from the lateral acceleration, or the roll angle detected from the roll angle sensor may be used as the rollover detection parameter.

In the above embodiment, when an abrupt steering maneuver is not made, the first weight coefficient K1 is set to 0; however, the first weight coefficient K1 may be set to a value greater than 0. Further, the upper limit value of the first weight coefficient K1 is 1 in the above embodiment. However, the upper limit value of the first weight coefficient K1 may be a value smaller than 1. In the above embodiment, when an abrupt steering-back maneuver is not made, the first weight coefficient K1 is set to 0; however, the first weight coefficient K1 may be set to a value greater than 0.

In the above embodiment, the first weight coefficient setting unit 128C and the second weight coefficient setting unit 128D determine the weight coefficients, respectively, by multiplying each of the count values by the corresponding coefficient. However, the relationship between the count values and the weight coefficients may be stored in advance in a table, and the weight coefficients may be determined from the count values based on the table.

In the above embodiment, the steering maneuver determination unit 125 determines that the driver makes an abrupt steering maneuver if the absolute value of the steering wheel turning speed is equal to or greater than the predetermined value, and if the filtered absolute value of the lateral acceleration resulting from the filtering process by which a decrease of the absolute value of the lateral acceleration is retarded is equal to or greater than the predetermined value. However, the steering maneuver determination unit 125 may determine that the driver makes an abrupt steering maneuver if the absolute value of the steering wheel turning speed is equal to or greater than the predetermined value and the absolute value of the lateral acceleration is equal to or greater than the predetermined value.

In the above embodiment, the parameter calculation unit 128 calculates the threshold calculation roll rate which is a rate of change of the roll angle of the vehicle CR, and sets the roll angle threshold value (the parameter threshold value) to a smaller value with an increase in the filtered absolute value of the threshold calculation roll rate resulting from the filtering process by which a decrease of the absolute value of the threshold calculation roll rate is retarded. However, the parameter threshold value may be obtained and set using an unfiltered threshold calculation roll rate.

In the above embodiment, the lateral acceleration-based roll rate Ra1' as the first roll rate and the yaw rate-based roll rate Ra2' as the second roll rate are exemplified. However, the lateral acceleration-based roll rate Ra1 as the first roll rate, and the steering angle-based roll rate as the second roll rate, which is calculated from the steering angle, may be combined using the first weight coefficient K1 to obtain the rollover detection parameter.

In the above embodiment, the roll angle threshold value is set to a greater value so that the rollover prevention control is not promptly initiated. This is because if the value of the roll rate is smaller, the vehicle is less likely to roll over. However, according to the present invention, the roll angle threshold value may be a fixed value.

In the above embodiment, the outside wheel target braking force is set by means of the PI control. However, the detailed setting method for the outside wheel target braking force is not limited to this specific method, and other methods may be adopted.

In the above embodiment, braking forces are applied to both front wheels and rear wheels during the rollover prevention control. However, braking forces may be applied to either one of the front wheels and the rear wheels.

What is claimed is:

1. A brake fluid pressure control apparatus for executing rollover prevention control, in which a brake is applied to at least one wheel of a vehicle at a timing when a rollover tendency of the vehicle is detected through a rollover detection parameter while the vehicle is turning, the brake fluid pressure control apparatus comprising:
   a parameter calculation unit that calculates the rollover detection parameter; and
   a steering maneuver determination unit that determines whether or not an abrupt steering maneuver is made,
   wherein the parameter calculation unit calculates a first composition roll angle as the rollover detection parameter by combining, at a predetermined first composition roll angle weight assignment ratio, a first roll angle with a second roll angle, the first roll angle being equivalent to an actual roll angle and the second roll angle being obtained using a parameter which changes with a phase earlier than the first roll angle, and
   wherein the parameter calculation unit calculates the first composition roll angle by changing the first composition roll angle weight assignment ratio such that a weight of the second roll angle is higher when the steering maneuver determination unit determines that the abrupt steering maneuver is made than when the steering maneuver determination unit determines that the abrupt steering maneuver is not made.

2. The brake fluid pressure control apparatus according to claim 1, further comprising a steering-back maneuver determination unit that determines whether or not an abrupt steering-back maneuver is made, and
   wherein the parameter calculation unit calculates a second composition roll angle as the rollover detection parameter by combining, at a predetermined second composition roll angle weight assignment ratio, a third roll angle with the first composition roll angle, the third roll angle being obtained from a parameter which changes with a phase earlier than the first roll angle and the second roll angle, and
   wherein the parameter calculation unit calculates the second composition roll angle by changing the second composition roll angle weight assignment ratio such that a weight of the third roll angle is higher when the steering-back maneuver determination unit determines that the abrupt steering-back maneuver is made than when the steering-back maneuver determination unit determines that the abrupt steering-back maneuver is not made.

3. The brake fluid pressure control apparatus according to claim 1, wherein the steering maneuver determination unit determines that the abrupt steering maneuver is made, if at least one of the following conditions is satisfied:
   (a) an absolute value of a steering wheel turning speed is equal to or greater than a predetermined steering wheel turning speed value, and an absolute value of a lateral acceleration is equal to or greater than a predetermined lateral acceleration value; and
   (b) the absolute value of the steering wheel turning speed is equal to or greater than the predetermined steering wheel turning speed value, and a filtered absolute value of the lateral acceleration resulting from a filtering process by which a decrease of the absolute value of the lateral acceleration is retarded is equal to or greater than the predetermined lateral acceleration value.

4. The brake fluid pressure control apparatus according to claim 1, wherein the parameter calculation unit comprises a first counter that increases a first count value if the steering maneuver determination unit determines that the abrupt steering maneuver is made, and to decrease the first count value if the steering maneuver determination unit determines that the abrupt steering maneuver is not made, and a first weight coefficient setting unit configured to set a first weight coefficient, which is equivalent to the weight of the second roll angle, in accordance with the first count value and in a range equal to or smaller than a predetermined upper limit value, and
   wherein the first counter increases the first count value even after the first weight coefficient reaches the predetermined upper limit value.

5. The brake fluid pressure control apparatus according to claim 2, wherein signs of values are defined by assigning first signs respectively to a value of a steering angle when the steering wheel is turned left, values of a lateral acceleration acting on the vehicle and a roll angle exhibited while the vehicle is stably turning left, and a value of a roll rate exhibited when the roll angle takes a greater value due to a left turn of the vehicle, and by assigning second signs respectively to a value of a steering angle when the steering wheel is turned right, values of the lateral acceleration acting on the vehicle and the roll angle exhibited while the vehicle is stably turning right, and the value of the roll rate exhibited when the roll angle takes a greater value due to a right turn of the vehicle, and the steering-back maneuver determination unit determines that the abrupt steering-back maneuver is made if all of the following conditions are satisfied:
   (1) one of the values of the steering angle and the lateral acceleration has the first sign, while the other one of the values has the second sign;
   (2) one of the values of the first roll angle and a first roll rate calculated from the first roll angle has the first sign, while the other one of the values has the second sign, or/and one of values of the second roll angle and a second roll rate calculated from the second roll angle has the first sign, while the other one of the values has the second sign; and
   (3) an absolute value of the first roll rate that satisfies the above condition (2) is equal to or greater than a predetermined first roll rate value or/and an absolute value of the second roll rate that satisfies the above condition (2) is equal to or greater than a predetermined second roll rate value.

6. The brake fluid pressure control apparatus according to claim 5, wherein the parameter calculation unit comprises a second counter that increases a second count value if the steering-back maneuver determination unit determines that the abrupt steering-back maneuver is made, and to decrease the second count value if the steering-back maneuver determination unit determines that the abrupt steering-back maneuver is not made, and a second weight coefficient setting unit configured to set a second weight coefficient, which is equivalent to the weight of the third roll angle, in accordance with the second count value and in a range equal to or smaller than a predetermined upper limit value, and wherein the second counter increases the second count value even after the second weight coefficient reaches the predetermined upper limit value.

7. The brake fluid pressure control apparatus according to claim 1, wherein the first roll angle is calculated from a lateral acceleration, and the second roll angle is calculated from a yaw rate.

8. The brake fluid pressure control apparatus according to claim 2, wherein the third roll angle is calculated from a steering angle.

* * * * *